US012596340B2

(12) United States Patent (10) Patent No.: US 12,596,340 B2

Myung et al. (45) Date of Patent: Apr. 7, 2026

(54) ELECTRONIC DEVICE CONTROLLING EXTERNAL DEVICE AND METHOD FOR CONTROLLING THE SAME

(71) Applicant: SAMSUNG ELECTRONICS CO., LTD., Suwon-si (KR)

(72) Inventors: Insik Myung, Suwon-si (KR); Choonkyoung Moon, Suwon-si (KR); Jiin Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 482 days.

(21) Appl. No.: 18/083,979

(22) Filed: Dec. 19, 2022

(65) Prior Publication Data

US 2023/0205157 A1    Jun. 29, 2023

Related U.S. Application Data

(63) Continuation of application No. PCT/KR2022/019354, filed on Dec. 1, 2022.

(30) Foreign Application Priority Data

Dec. 24, 2021  (KR) ........................ 10-2021-0186893
Jan. 19, 2022  (KR) ........................ 10-2022-0008102

(51) Int. Cl.
G05B 19/042 (2006.01)
H04L 12/28 (2006.01)
(52) U.S. Cl.
CPC .......... G05B 19/042 (2013.01); H04L 12/282 (2013.01); *G05B 2219/2642* (2013.01)
(58) Field of Classification Search
CPC .......... G05B 19/042; G05B 2219/2642; H04L 12/282; H04L 12/28; H04L 12/2809; H04L 2012/285; G06F 3/0481; H04Q 9/00
See application file for complete search history.

(56) References Cited

U.S. PATENT DOCUMENTS 7,966,634 B2 * 6/2011 Hoppe ............... H04N 21/4622
725/135
2012/0291068 A1 * 11/2012 Khushoo ............... H04L 12/282
725/38

(Continued)

FOREIGN PATENT DOCUMENTS

CN      105929703 A     9/2016
EP      3402138 A1     11/2018

(Continued)

OTHER PUBLICATIONS

Extended European Search Report dated Sep. 23, 2024 for EP Application No. 22911674.4.

(Continued)

*Primary Examiner* — Charles R Kasenge
(74) *Attorney, Agent, or Firm* — NIXON & VANDERHYE P.C.

(57) ABSTRACT

An electronic device may include at least one communication circuit, a display, a memory, and at least one processor, wherein the at least one processor may be configured to obtain function information associated with an external electronic device based on the external electronic device being detected via the at least one communication circuit, to obtain, based on the function information associated with the external electronic device, a sequence of a plurality of functions of the external electronic device that are mapped to a single set button included in a remote controller that communicates with the electronic device, to control the display to display, in a partial area of the display, a user interface indicating that the external electronic device is controllable via the single set button of the remote controller, and to transmit an executive command associated with a first function mapped to the single set button according to the sequence of the plurality of functions to the external electronic device via the at least one communication circuit in response to a signal corresponding to operation of the single set button of the remote controller being received.

20 Claims, 21 Drawing Sheets

(56)                    References Cited

U.S. PATENT DOCUMENTS

| 2016/0165295 | A1 | 6/2016 | Black et al. |
| 2017/0013224 | A1 | 1/2017 | Heo et al. |
| 2017/0048476 | A1* | 2/2017 | Freiin von Kapri ........................ H04N 21/43615 |
| 2017/0366778 | A1 | 12/2017 | Kim et al. |
| 2020/0059522 | A1 | 2/2020 | Yoon et al. |
| 2022/0035498 | A1 | 2/2022 | Kim et al. |

FOREIGN PATENT DOCUMENTS

| JP | 2003-324780 | 11/2003 |
| KR | 10-2006-0076974 | 7/2006 |
| KR | 10-2017-0001434 A | 1/2017 |
| KR | 10-2017-0083240 A | 7/2017 |
| KR | 10-2017-0143406 A | 12/2017 |
| KR | 10-1937174 | 1/2019 |
| KR | 10-2020-0019507 | 2/2020 |
| KR | 10-2020-0069060 A | 6/2020 |
| KR | 10-2021-0004198 | 1/2021 |
| KR | 10-2021-0032834 A | 3/2021 |
| KR | 10-2002-0078969 | 10/2022 |

OTHER PUBLICATIONS

International Search Report dated Mar. 10, 2023 for PCT/KR2022/019354.

PCT Written Opinion dated Mar. 10, 2023 for PCT/KR2022/019354.

* cited by examiner airPurifierFanMode
STATUS: PROPOSED
Maintains and sets the state of an air conditioner's fan

ATTRIBUTES

| Name | Description | Type | Values |
|---|---|---|---|
| airPurifierFanMode | The current mode of the air purifierfan, an enum of auto, low, medium, high, sleep, quiet or windFree | enum | - auto -<br>- sleep -<br>- low -<br>- medium -<br>- high -<br>- quiet -<br>- windFree - |
| supportedAirPurifierFanModes | Supported states for this air purifier fan to be in | array of enum | |

ELECTRONIC DEVICE CONTROLLING EXTERNAL DEVICE AND METHOD FOR CONTROLLING THE SAME

CROSS-REFERENCE TO RELATED APPLICATIONS

This application is a continuation of International Application No. PCT/KR2022/019354, filed Dec. 1, 2022, designating the United States, in the Korean Intellectual Property Receiving Office, and claiming priority to KR Patent Application No. 10-2021-0186893, filed Dec. 24, 2021, and to KR Patent Application No. 10-2022-0008102, filed Jan. 19, 2022, the disclosures of which are all hereby incorporated by reference herein in their entireties.

BACKGROUND

Field

An example embodiment relates to an electronic device for controlling an external electronic device and a control method therefore.

Description of Related Art

Recently, the development of semiconductor technology and wireless communication technology has enabled a network to be configured with various things having communication functions, and thus the things can be controlled conveniently. Technology that includes a communication function in things and connects the same over a network is referred to as Internet of Things (IoT), and has been widely utilized in real life.

Since electronic products interoperate via an IoT server, a corresponding electronic product is capable of being controlled by another electronic product, instead of being controlled directly.

For example, electronic products, such as an air conditioner, an air cleaner, a robot cleaner, and the like, that are connected to the same account as that of a smart TV may be controlled by controlling the smart TV using a remote controller.

However, in the case of controlling another electronic product via the smart TV, a user needs to intentionally select a menu for controlling another electronic product so as to activate a user interface related to the other electronic product, and needs to select and execute a plurality of functions displayed in the user interface using a remote controller, and thus multiple remote controlling operations are required.

In addition, in the case that the user interface related to another electronic product is activated while a user is watching a content via the smart TV, the content may be covered with the user interface, and thus inconvenience may be caused when a user is watching the content.

SUMMARY

Certain example embodiments relate to an electronic device for intuitively controlling other adjacent electronic products without disturbing content watching, and/or a control method therefor.

According to an example embodiment, an electronic device may include at least one communication circuit, a display, a memory, and at least one processor, and the at least one processor may be configured to obtain function information associated with an external electronic device in a case that the external electronic device is detected via the at least one communication circuit, to obtain, based on the function information associated with the external electronic device, the sequence of a plurality of functions of the external electronic device that are mapped to a single set button included in a remote controller that communicates with the electronic device, to control the display to display, in a partial area of the display, a user interface indicating that the external electronic device is controllable via the single set button of the remote controller, and to transmit an executive command associated with a first function mapped to the single set button according to the sequence of the plurality of functions to the external electronic device via the at least one communication circuit in a case that a signal corresponding to operation of the single set button of the remote controller is received.

According to an example embodiment, a control method of an electronic device may include an operation of obtaining function information associated with an external electronic device in a case that the external electronic device is detected via at least one communication circuit, and operation of obtaining, based on the function information associated with the external electronic device, the sequence of a plurality of functions of the external electronic device that are mapped to a single set button included in a remote controller that communicates with the electronic device, and operation of controlling a display to display, in a partial area of the display, a user interface indicating that the external electronic device is controllable via the single set button of the remote controller, and an operation of transmitting an executive command associated with a first function mapped to the single set button according to the sequence of the plurality of functions to the external electronic device via the at least one communication circuit in a case that a signal corresponding to operation of the single set button of the remote controller is received.

Although a user does not intentionally perform a menu execution operation for controlling an external electronic device around the electronic device, an electronic device according to an example embodiment can control a single set button included in a remote controller, and can display a user interface related to control of the external electronic device in a partial area of a display, thereby minimizing or reducing disturbing content watching.

BRIEF DESCRIPTION OF DRAWINGS

The above and other aspects, features, and advantages of certain example embodiments will be more apparent from the following detailed description, taken in conjunction with the accompanying drawings, in which:

FIG. 8 is a diagram illustrating function information of an external electronic device obtained by an electronic device according to an example embodiment.

DETAILED DESCRIPTION

Figure 1:
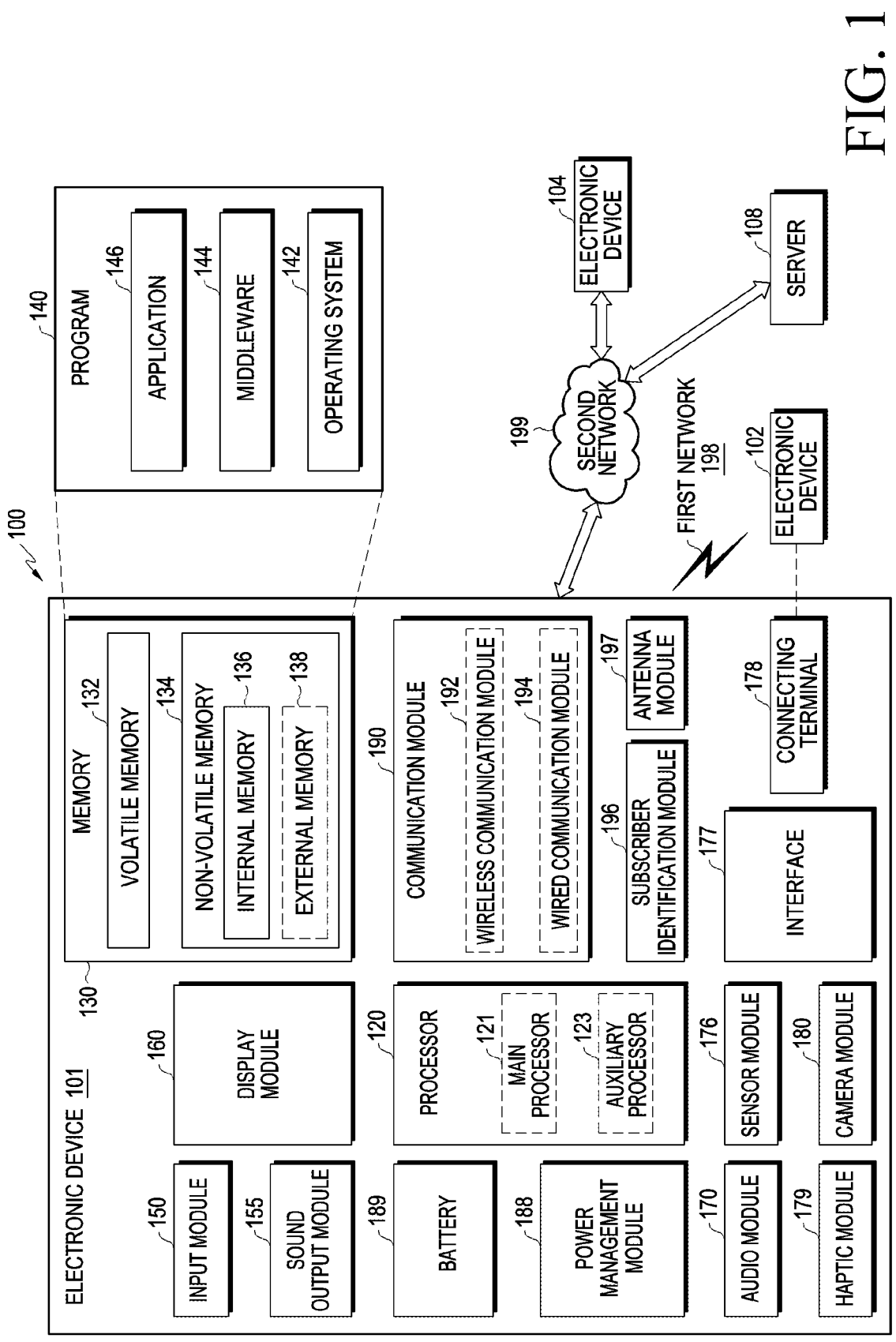
FIG. 1 is a block diagram illustrating an electronic device in a network environment according to an example embodiment.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (which may include external memory 138 and/or internal memory 136). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176, comprising at least one sensor, may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, comprising communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192, comprising communication circuitry, may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197, comprising at least one antenna, may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
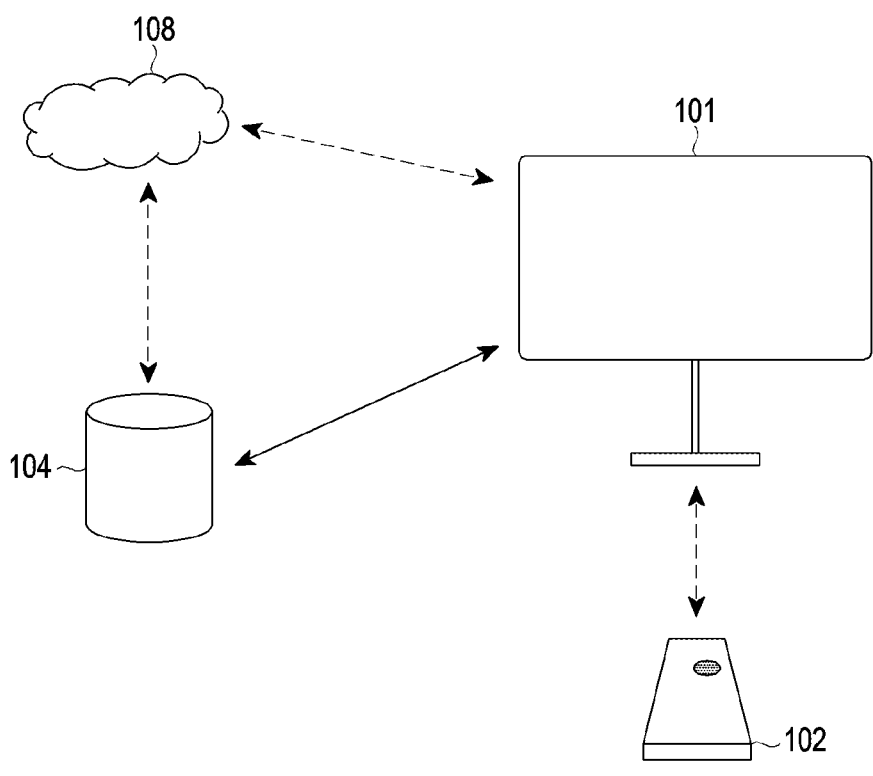
FIG. 2 is a diagram illustrating a communication connection type of an electronic device according to an example embodiment.

FIG. 2 is a diagram illustrating a communication connection type of an electronic device according to an example embodiment.

Referring to FIG. 2, the electronic device 101 (e.g., the electronic device 101 of FIG. 1 or the processor 120 of FIG. 1) may communicate with the server 108 (e.g., the server 108 of FIG. 1) and the external electronic device 104 (e.g., the electronic device 104 of FIG. 1) via at least one communication circuit (e.g., the communication module 190 of FIG. 1). For example, the electronic device 101 may communicate with the server 108 via a long-range wireless communication network (e.g., Wi-Fi, a legacy cellular network, a 5G network, a next generation communication network, the Internet, or a computer network (e.g., LAN or WAN)), and may communicate with the external electronic device 104 via a short-range wireless communication network (e.g., Bluetooth, wireless fidelity (WiFi) direct, ultra wide band (UWB), or an infrared data association (IrDA)). According to an embodiment, the electronic device 101 may be a stationary or mobile smart TV, and the external electronic device 104 may be a stationary or mobile electronic product (e.g., an air purifier, an air conditioner, a robot cleaner, a washing machine, and a refrigerator).

According to an embodiment, the electronic device 101 may measure the distance to the external electronic device 104 and the direction to the external electronic device 104 via short-range wireless network communication.

According to an embodiment, in the case that the external electronic device 104 is detected via short-range wireless network communication, the electronic device 101 may receive information associated with the external electronic device 104 from the server 108.

According to an embodiment, information associated with a device name, a model name, an install location, a list of remotely controllable functions, and/or a connection state in association with the connected electronic device 101 and the external electronic device 104 may be stored in the server 108, and the server 108 may transmit part of the information associated with the external electronic device 104 among the stored information to the electronic device 101 in response to a request from the electronic device 101.

According to an embodiment, the external electronic device 104 may perform communication via a long-range wireless communication network with the server 108. For example, the external electronic device 104 connectable to the electronic device 101 may be in the state of being registered in and connected, directly or indirectly, to the server 108 using the same account. According to an embodiment, although a single external electronic device 104 is illustrated in FIG. 2, two or more external electronic devices may be present.

According to an embodiment, based on the information associated with the external electronic device 104 received from the server 108 and/or information associated with the external electronic device 104 stored in the electronic device 101, the electronic device 101 may obtain the sequence of a plurality of functions of the external electronic device 104 that are mapped to a single set button (e.g., an extra button) of the remote controller 102 in a cyclical (or toggle) manner, so as to control the external electronic device 104 via a signal received from the remote controller 102 (e.g., the electronic device 102 of FIG. 1).

According to an embodiment, the electronic device 101 may display, in a partial area of the display (e.g., the display module 160 of FIG. 1), a user interface indicating that the external electronic device 104 is controllable using the remote controller 102.

According to an embodiment, the electronic device 101 may communicate with the remote controller 102 via the short-range wireless communication such as Bluetooth, Infrared-ray communication, or the like, may control the electronic device 101 via a signal received from the remote controller 102, or may transmit a control command to control the external electronic device 104.

According to an embodiment, in the case that a signal corresponding to operation of the single set button of the remote controller 102 is received, the electronic device 101 may transmit a command to execute a mapped function of the external electronic device 104 to the external electronic device 104 directly or via the server 108.

According to an embodiment, a function mapped to the single set button of the remote controller 102 may be changed based on a function executed by operation of the single set button of the remote controller 102 and the type of the external electronic device 104. According to an embodiment, in the case that a function mapped to the single set button of the remote controller 102 is changed, the electronic device 101 may also change information related to the function mapped to the single set button of the remote controller 102 included in the user interface.

Figure 3:
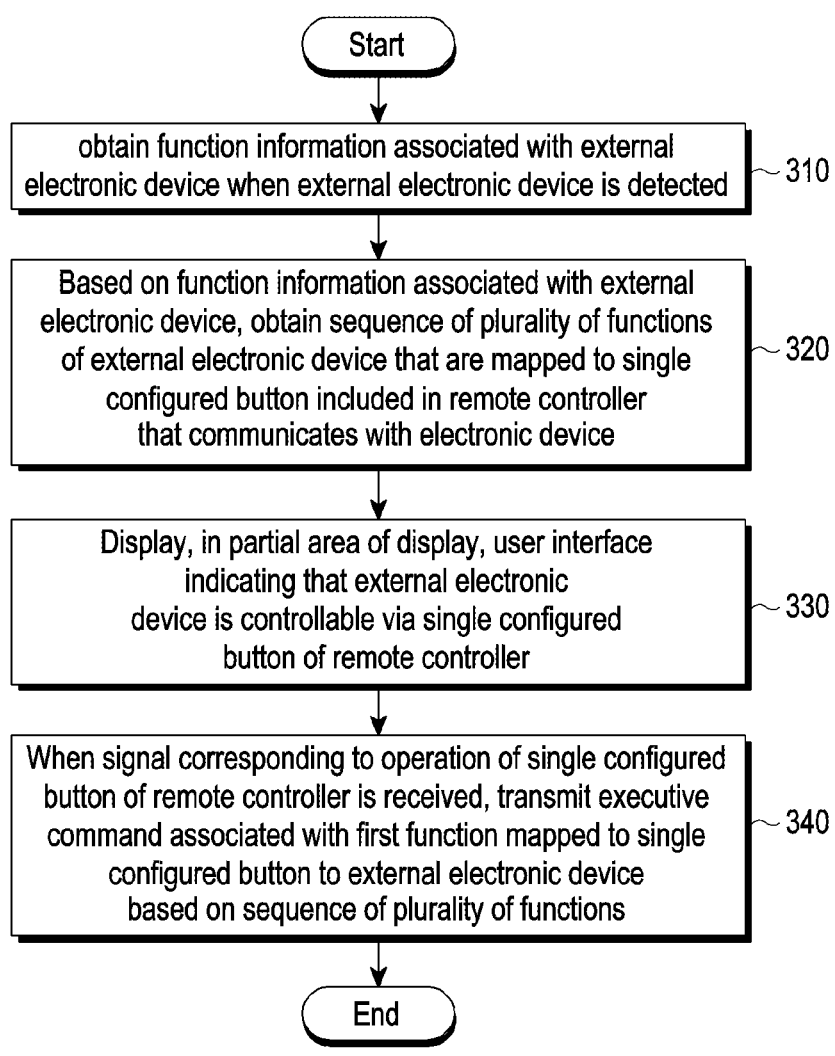
FIG. 3 is a flowchart illustrating an operation of controlling an external electronic device by an electronic device according to an example embodiment.

FIG. 3 is a flowchart illustrating an operation of controlling an external electronic device by an electronic device according to an example embodiment.

Referring to FIG. 3, in operation 310, an electronic device (e.g., the electronic device 101 of FIG. 1 or the processor 120 of FIG. 1) may obtain function information of an external electronic device (the electronic device 104 of FIG. 1) based on the external electronic device being detected. For example, the electronic device may detect the external electronic device when the electronic device or the external electronic device moves, when the power of the electronic device is turned on, or when a signal corresponding to operation of a single set button of a remote controller (e.g., the electronic device 102 of FIG. 1) in a predetermined manner (e.g., a long-press) by a user in the state in which an object device to be controlled by the remote controller is not selected.

According to an embodiment, the electronic device may obtain function information associated with the external electronic device from a server (e.g., the server 108 of FIG. 1) via at least one communication circuit (e.g., the communication module 190 of FIG. 1).

According to an embodiment, the electronic device may obtain function information associated with the external electronic device stored in the memory (e.g., the memory 130 of FIG. 1).

According to an embodiment, the function information associated with the external electronic device may include information associated with a device name, a model name, an install location, a list of remotely controllable functions and/or a connection state in association with the external electronic device, and some may be obtained from the server, and some other may be obtained from the memory.

The function information of the external electronic device according to an embodiment will be described with reference to FIG. 8 below.

According to an embodiment, when a plurality of external electronic devices are detected via at least one communication circuit, the electronic device may obtain the sequence of the plurality of external electronic devices mapped to the single set button of the remote controller. According to an embodiment, the electronic device may display, in a partial area of a display, a user interface including information related to the sequence of the plurality of external electronic devices and information related to an external electronic device mapped to the set button of the remote controller among the plurality of external electronic devices.

According to an embodiment, in the case that a signal corresponding to operation of the single set button of the remote controller is received, the electronic device may identify an object device to be controlled by the single set button of the remote controller based on the sequence of the plurality of external electronic devices. According to an embodiment, in the case that the plurality of external electronic devices are detected, an operation of selecting an external electronic device to be controlled by the remote controller will be described with reference to FIG. 5, FIG. 6A, and FIG. 6B.

According to an embodiment, in the case that the plurality of external electronic devices are detected via at least one communication circuit, the electronic device may determine the nearest external electronic device as an object device to be controlled.

According to an embodiment, in the case that a second external electronic device approaches and the electronic device detects the second external electronic device in the state in which the electronic device is capable of controlling a first external electronic device using the remote controller, the electronic device may display, in the display, a message for identifying whether to control the second external electronic device using the remote controller. For example, after displaying the message for identifying whether to control the second external electronic device using the remote controller, the electronic device may identify, based on a signal received from the remote controller, the first external electronic device or the second electronic device as an external electronic device to be controlled by the remote controller.

According to an embodiment, in operation 320, based on the function information associated with the external electronic device, the electronic device may obtain the sequence of a plurality of functions of the external electronic device that are mapped to the single set button included in the remote controller that communicates with the electronic device.

According to an embodiment, the plurality of functions may include a function of turning on the power of an external electronic device and a function of turning off the power of the external electronic device, and may include a predetermined number of superordinate functions among the plurality of functions included in the function information associated with the external electronic device. For example, the electronic device may obtain the sequence of the plurality of functions of the external electronic device in order of the function of turning on the power of the external electronic device, the plurality of functions of the external electronic device, and the function of turning off the power of the external electronic device, and a function subsequent to the function of turning off the power of the external electronic device may be configured to be the function of turning on the power of the external electronic device in a cyclic manner.

According to an embodiment, the plurality of functions may be sequentially changed via operation of the single set button of the remote controller, but there is a function controllable via an up/down button of the remote controller depending on the function.

The sequence of the plurality of functions according to an embodiment will be described with reference to FIGS. 7A, FIG. 7B, and FIGS. 9A to 9C.

According to an embodiment, in operation 330, the electronic device may display, in a partial area of the display, a user interface (e.g., a simple control card or a pop-up card) indicating that an external electronic device is controllable via the single set button of the remote controller.

According to an embodiment, the user interface may include information associated with the sequence of the plurality of functions and information associated with a function that is being executed in the external electronic device. According to an embodiment, the descriptions of the user interface will be described with reference to FIG. 10.

According to an embodiment, the electronic device may display the user interface in a partial area of the display related to the location of the external electronic device relative to the electronic device. For example, the electronic device may display the user interface in an edge area of the display including a line that connects the location of the center of the electronic device and the location of the external electronic device. The location of the user interface according to an embodiment will be described with reference to FIG. 17 below.

According to an embodiment, in the case that the external electronic device is detected via at least one communication circuit, the electronic device may display a message for identifying whether to control the external electronic device using the single set button of the remote controller (e.g., the electronic device 102 of FIG. 1) in a partial area of the display (e.g., the display module 160 of FIG. 1). According to an embodiment, in the case that a user input for controlling the external electronic device is input to the single set button of the remote controller in response to the displayed message, the user interface may be displayed in a partial area of the display. According to an embodiment, the message for identifying whether to control the external electronic device using the single set button of the remote controller in the case that the external electronic device is detected, will be described with reference to FIG. 4 below.

According to an embodiment, in operation 340, in response to a signal corresponding to operation of the single set button of the remote controller being received, the electronic device may transmit, to the external electronic device, an executive command associated with a first function mapped to the single set button based on the sequence of the plurality of functions.

According to an embodiment, in the case that a signal corresponding to operation of the single set button of the remote controller is received, the electronic device may transmit the executive command associated with the first function mapped to the single set button to the external electronic device directly or via the server.

For example, in the case that the executive command associated with the first function of the external electronic device is transmitted via the server, the electronic device may transmit the executable command associated with the first function to the server via the at least one communication circuit so that the server transmits the executable command associated with the first function to the external electronic device.

According to an embodiment, upon reception of a signal corresponding to operation of the single set button of the remote controller, the electronic device may display that the external electronic device is executing the first function in the user interface. According to an embodiment, an operation of changing the user interface based on the reception of a signal corresponding to operation of the single set button of the remote controller will be described with reference to FIGS. 11 to 14.

According to an embodiment, after reception of a signal corresponding to operation of the single set button of the remote controller, the electronic device may map a second function that is a function subsequent to the first function to the single set button of the remote controller according to the sequence of the plurality of functions.

According to an embodiment, in the case that a signal corresponding to a set operation performed on the single set button of the remote controller is received, the electronic device may transmit an executive command associated with the set function of the external electronic device to the external electronic device directly or via the server. For example, in the case that a signal corresponding to a long press (or a double-press) on the single set button of the remote controller is received, the electronic device may transmit an executive command associated with the function of turning off the power of the external electronic device to the external electronic device directly or via the server, irrespective of the sequence of the plurality of external electronic devices.

According to an embodiment, in the case that a signal corresponding to operation of the single set button of the remote controller is not received within a predetermined period of time after the user interface is displayed, the electronic device may delete the user interface displayed in the display.

As described above, although a user does not intentionally perform a menu execution operation for controlling an external electronic device around the electronic device, the external electronic device may be capable of being controlled using a single set button included in a remote controller, and a user interface related to control of the external electronic device may be displayed in a partial area of a display, and thus disturbing of content watching may be minimized or reduced.

Figure 4:
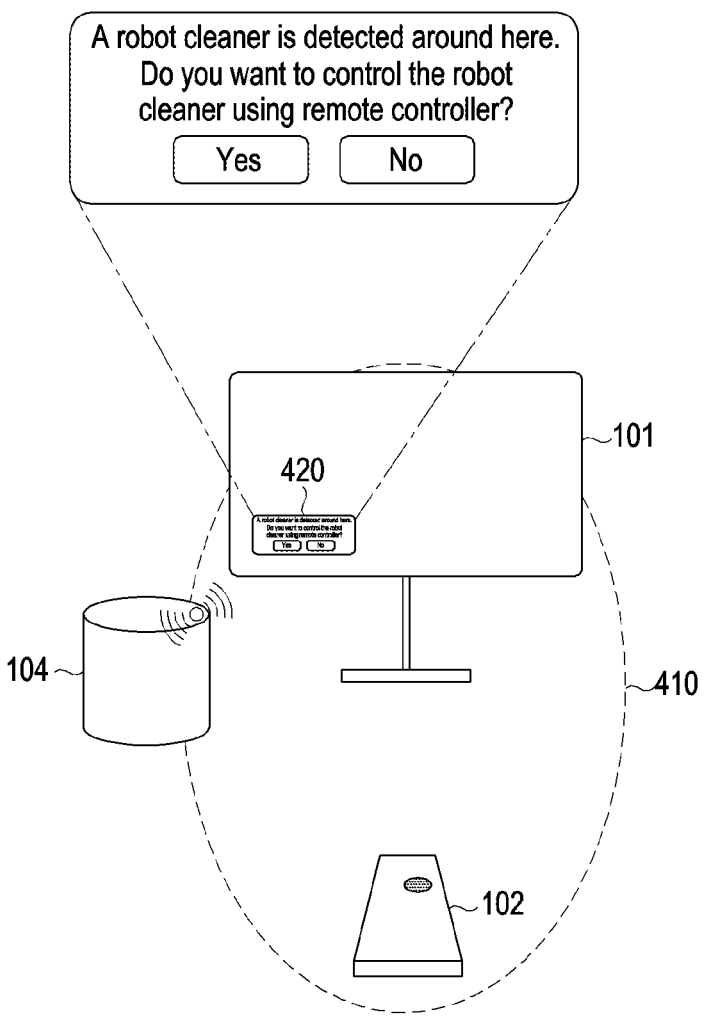
FIG. 4 is a diagram illustrating an operation of identifying whether to control an external electronic device in the case that the external electronic device is detected around an electronic device according to an example embodiment.

FIG. 4 is a diagram illustrating an operation of identifying whether to control an external electronic device in the case that the external electronic device is detected around an electronic device according to an example embodiment.

Referring to FIG. 4, the electronic device 101 (e.g., the electronic device 101 of FIG. 1 or the processor 120 of FIG. 1) may communicate with the remote controller 102 (e.g., the electronic device 102 of FIG. 1). For example, the electronic device 101 and the remote controller 102 may perform transmission and reception of a communication signal (e.g., a Bluetooth signal, wi-fi signal, an infrared-ray communication signal) within a control area 410. Each processor herein comprises processing circuitry.

According to an embodiment, the electronic device 101 may perform transmission or reception of a communication signal (e.g., a UWB signal, a Bluetooth signal, a wi-fi signal) with the external electronic device 104, and may identify whether the external electronic device 104 is located in the control area 410 based on the strength of the communication signal. For example, it may be detected that the external electronic device 104 is located in the control area 410 when the electronic device 101 moves or the external electronic device 104 moves, or it may be detected that the external electronic device 104 is located in the control area 410 when the power of the electronic device 101 is turned on, irrespective of the movement of the electronic device 101 and the external electronic device 104.

According to an embodiment, if it is detected that the external electronic device 104 (e.g., the electronic device 104) is located in the control area 410, the electronic device 101 may display a message 420 for identifying whether to control the external electronic device 104 using the remote controller 102 in a partial area of a display (e.g., the display module 160 of FIG. 1).

According to an embodiment, when receiving a signal for operating the external electronic device 104 using the remote controller 102 from the remote controller 102 after displaying the message 420, the electronic device 101 may identify the external electronic device 104 as an object device to be controlled, may obtain function information of the external electronic device 104 via a memory (e.g., the memory 130 of FIG. 1) and/or a server (e.g., the server 108 of FIG. 1), and may display a user interface indicating that the external electronic device 104 is controllable by the remote controller 102 in a partial area of the display.

Figure 5:
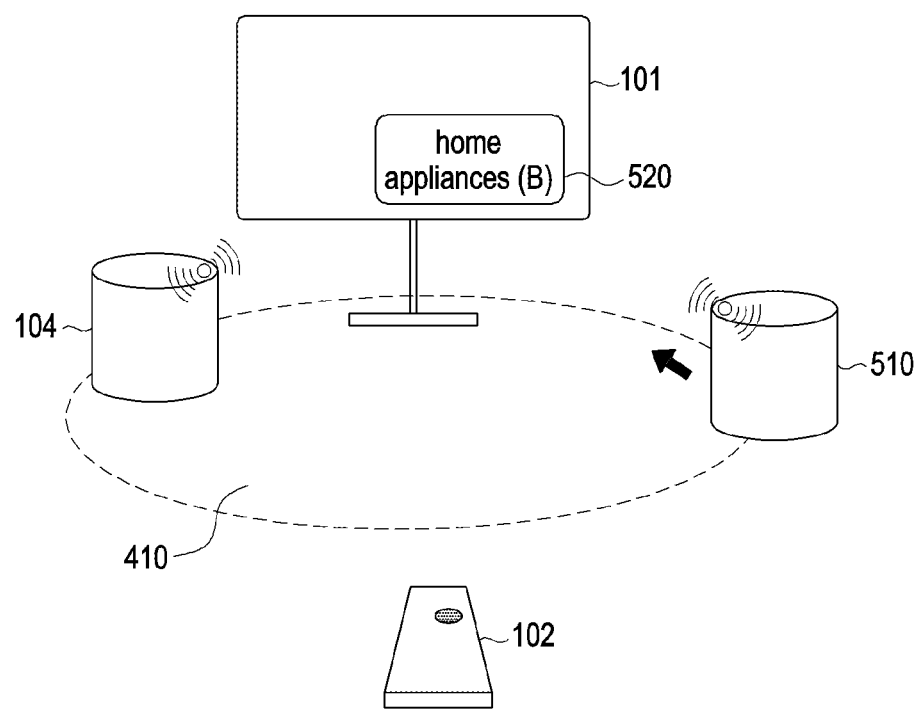
FIG. 5 is a diagram illustrating an operation of determining an object to be controlled in the case that a plurality of external electronic devices are detected around an electronic device according to an example embodiment.

FIG. 5 is a diagram illustrating an operation of determining an object to be controlled in the case that a plurality of external electronic devices are detected around an electronic device according to an example embodiment. For example, FIG. 5 illustrates the case in which a second external electronic device enters a control area in the state in which an external electronic device is controllable using a remote controller as illustrated in FIG. 4.

Referring to FIG. 5, in the state in which the electronic device 101 (e.g., the electronic device 101 of FIG. 1) is capable of controlling the external electronic device 104 (e.g., the electronic device 104 of FIG. 1) disposed in the control area 410 using the remote controller 102 (e.g., the electronic device 102 of FIG. 1), if a second external electronic device 510 (e.g., the electronic device 104 of FIG. 1) enters the control area 410, the electronic device 101 (e.g., the electronic device 101 of FIG. 1) may display a user interface 520 related to control of the second external electronic device 510 in a partial area of a display (e.g., the display module 160 of FIG. 1).

According to an embodiment, if the second external electronic device 510 newly enters the control area 410, the electronic device 101 may obtain information associated with the second external electronic device 510, may obtain the sequence of a plurality of functions of the second external electronic device 510 executable using a single set button of the remote controller 102, and may display the user interface 520 indicating that the second external electronic device 510 is controllable using the remote controller 102 in a partial area of the display.

According to an embodiment, if the second external electronic device 510 newly enters the control area 410, the electronic device 101 displays a message for identifying whether to control the second external electronic device 510 using the remote controller 102, and in the case that a user input for controlling the second external electronic device 510 is received using the remote controller 102, the electronic device 101 may display the user interface 520 indicating that the second external electronic device 510 is controllable using the remote controller 102 in a partial area of the display.

FIG. 5 illustrates that the second external electronic device 510 moves and enters the control area 410. However, according to an embodiment, the external electronic device 104 and the second external electronic device 510 may be detected when the electronic device 101 is moved or the power of the electronic device 101 is turned on.

According to an embodiment, in the case that a plurality of electronic devices are detected, or the second external electronic device 510 is newly detected in the state in which the single external electronic device 104 is controlled using the remote controller 102, the electronic device 101 may obtain the sequence of the plurality of external electronic devices 104 and 510 mapped to a single set button of the remote controller 102.

According to an embodiment, if a signal corresponding to operation of the single set button of the remote controller 102 is received, the electronic device 101 may identify an object device to be controlled by the single set button of the remote controller 102 based on the sequence of the plurality of external electronic devices 104 and 510. According to an embodiment, the operation of identifying the object device to be controlled by the single set button of the remote controller 102 by operating the single set button of the remote controller 102 will be described with reference to FIGS. 6A and 6B.

Figure 6A:
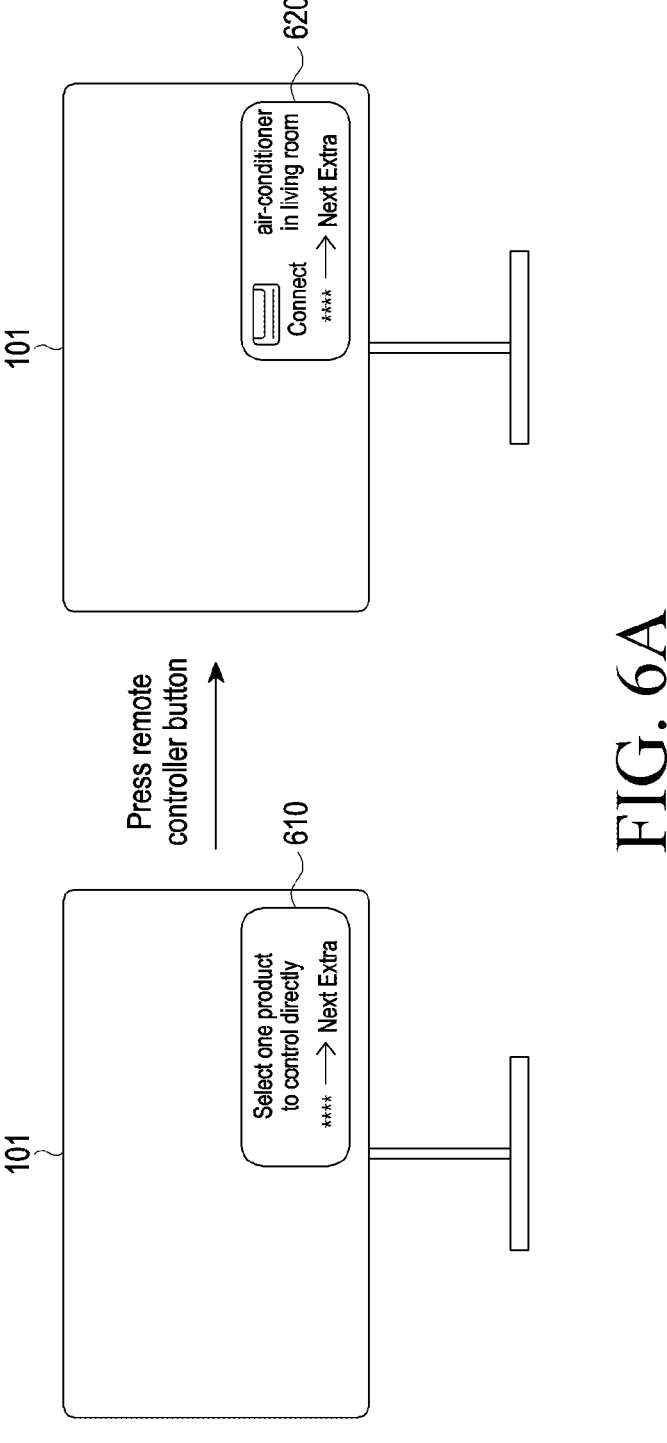
FIG. 6A is a diagram illustrating an operation of determining an object to be controlled in the case that a plurality of external electronic devices are detected around an electronic device according to an example embodiment.

FIG. 6A is a diagram illustrating an operation of determining an object to be controlled in the case that a plurality of external electronic devices are detected around an electronic device according to an example embodiment.

Referring to FIG. 6A, in the case that a plurality of external electronic devices (e.g., the electronic device 104 of FIG. 1) are detected, an electronic device (e.g., the electronic device 101 of FIG. 1 or the processor 120 of FIG. 1) may obtain the sequence of the plurality of external electronic devices mapped to a single set button of a remote controller (e.g., the electronic device 102 of FIG. 1). For example, based on the distances to the plurality of detected external electronic devices or the priorities of the plurality of external electronic devices, the electronic device may obtain the sequence of the plurality of external electronic devices as illustrated in FIG. 6B.

Figure 6B:
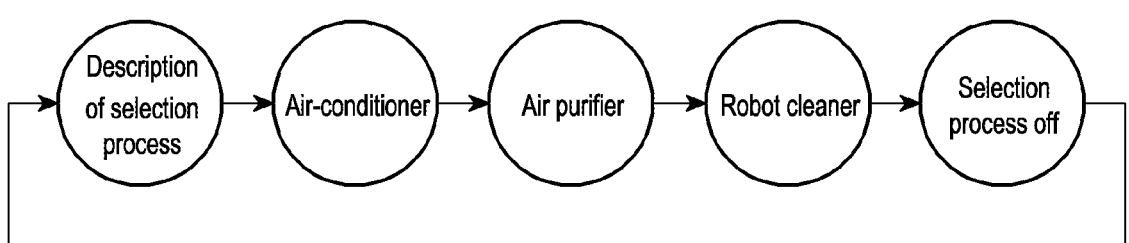
FIG. 6B is a diagram illustrating an operation of determining an object to be controlled in the case that a plurality of external electronic devices are detected around an electronic device according to an example embodiment.

FIG. 6B is a diagram illustrating an operation of determining an object to be controlled in the case that a plurality of external electronic devices are detected around an electronic device according to an example embodiment.

Referring to FIG. 6B, based on the distances to the plurality of detected external electronic devices or the priorities of the plurality of external electronic devices, an electronic device may obtain the sequence of the plurality of external electronic devices. For example, the electronic device may obtain the sequence of the plurality of external electronic devices in order of descriptions of selection process, an air conditioner, an air purifier, a robot cleaner, and selection process off. The number of external electronic devices, the types of external electronic devices, and the sequence of the external electronic devices illustrated in FIG. 6B are merely an example, and the disclosure is not limited thereto.

Referring again to FIG. 6A, according to an embodiment, the electronic device may display a user interface 610 that describes a process of selecting an object device to be controlled using the single set button of the remote controller (e.g., the electronic device 102 of FIG. 1) in a partial area of a display (e.g., the display module 160 of FIG. 1). According to an embodiment, in the state in which the user interface 610 that describes the process of selecting an object device to be controlled is displayed, a first external electronic device in the sequence of the plurality of external electronic devices may be mapped to the single set button of the remote controller.

According to an embodiment, in the state in which the user interface 610 that describes the process of selecting an object device to be controlled is displayed, if a signal corresponding to operation of the single set button of the remote controller is received from the remote controller, the electronic device may display a user interface 620 displaying an external electronic device to be controlled by the signal set button of the remote controller according to the sequence of the plurality of external electronic devices in a partial area of the display. For example, referring to the sequence of the plurality of external electronic devices illustrated in FIG. 6B, if a signal corresponding to operation of the single set button of the remote controller is received from the remote controller, the electronic device may display the user interface 620 including that the external electronic device to be controlled by the single set button of the remote controller is an air conditioner.

According to an embodiment, in the state in which the user interface 620 indicating that the external electronic device to be controlled by the single set button of the remote controller is an air conditioner is displayed, if a user input that operates a "confirm" button included in the remote controller is received, or a user input that operates the single set button of the remote controller is not received during a predetermined period of time, the electronic device may identify the external electronic device included in the user interface 620 as an object device to be controlled. According to an embodiment, if the object device to be controlled is identified, the electronic device may change a user interface to include information related to a function of the identified object device to be controlled. According to an embodiment, the electronic device may display a user interface including information related to the function of the identified object device to be controlled in a partial area of the display based on the location of the electronic device relative to the identified object device to be controlled.

According to an embodiment, in the state in which the user interface 620 indicating that the external electronic device to be controlled by the single set button of the remote controller is an air conditioner is displayed, if a signal corresponding to operation of the single set button of the remote controller is received from the remote controller, the electronic device may change a user interface to indicate that the external electronic device to be controlled by the single set button of the remote controller is an air purifier.

Figure 7A:
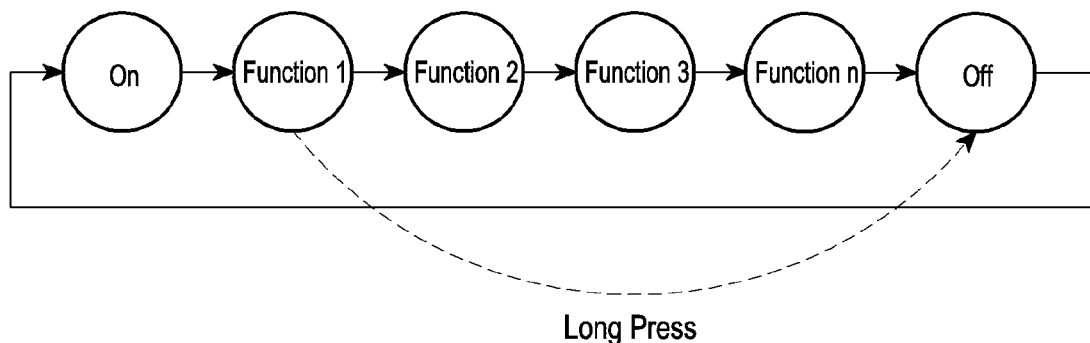
FIG. 7A is a diagram illustrating the sequence of a plurality of functions of an external electronic device according to an example embodiment.

FIG. 7A is a diagram illustrating the sequence of a plurality of functions of an external electronic device according to an example embodiment.

Referring to FIG. 7A, based on obtained function information of an external electronic device (e.g., the electronic device 104 of FIG. 1), an electronic device (e.g., the electronic device 101 of FIG. 1 or the processor 120 of FIG. 1) may obtain the sequence of a plurality of functions of the external electronic device to be controlled by a single set button of a remote controller (e.g., the electronic device 102 of FIG. 1). For example, the sequence of the plurality of functions of the external electronic device may include a function of turning on the external electronic device and a function of turning off the external electronic device, and a plurality of functions of the external electronic device may be included sequentially between the function of the turning on the external electronic device and the function of turning off the external electronic device.

According to an embodiment, the electronic device may obtain the sequence of the plurality of functions that is configured to change a function mapped to the single set button of the remote controller in order of the function of turning on the power of the external electronic device, function 1, function 2, function 3, function n, and the function of turning off the external electronic device, every time that the single set button of the remote controller is pressed. According to an embodiment, the electronic device may obtain the sequence of the plurality of functions that is configured to cyclically have the function of turning on the power of the external electronic device as a function subsequent to the function of turning off the external electronic device.

According to an embodiment, irrespective of a function mapped to the single set button of the remote controller in the sequence of the plurality of functions, in the case that a signal corresponding to a set operation (e.g., a long-press) performed on the single set button of the remote controller is received from the remote controller, the electronic device may transmit an executive command of a set function (e.g., the function of turning off the power of the external electronic device) to the external electronic device directly or via a server (e.g., the server 108 of FIG. 1).

Figure 7B:
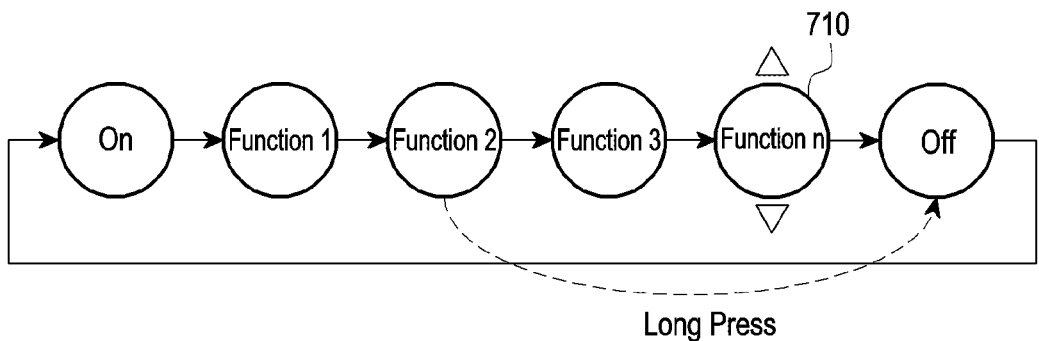
FIG. 7B is a diagram illustrating the sequence of a plurality of functions of an external electronic device according to an example embodiment.

FIG. 7B is a diagram illustrating the sequence of a plurality of functions of an external electronic device according to an example embodiment.

Referring to FIG. 7B, in the case that a function 710 (e.g., temperature control) of performing an up/down control of a number is included in a mode of an external electronic device, if a signal corresponding to operating an up button or a down button of the remote controller is received in the state in which the external electronic device is executing the function 710 that performs an up/down control of a number, the electronic device may perform an operation of changing the number. According to an embodiment, in the state in which the function 710 that performs an up/down control of a number is executed, if a signal corresponding to operating the single set button of the remote controller is received, the currently executed function 710 may be terminated and a subsequent function may begin.

According to an embodiment, a plurality of functions of the external electronic device illustrated in FIGS. 7A and 7B may be obtained based on function information of an external electronic device illustrated in FIG. 8.

FIG. 8 is a diagram illustrating function information of an external electronic device obtained by an electronic device according to an example embodiment. For example, FIG. 8 illustrates the received function information of an air purifier.

Referring to FIG. 8, for example, the function information of the external electronic device may be "device name+ mode" under the "capabilities" item of the "component" item of the "device profile" item. For example, in the case that the external electronic device is an air purifier, the function information of the air purifier may be "airPurifier-Fan+Mode".

According to an embodiment, an electronic device (e.g., the electronic device 101 of FIG. 1 or the processor 120 of FIG. 1) may obtain the sequence of a plurality of functions of the external electronic device based on the plurality of functions obtained from values 810 included in the obtained function information of the external electronic device. For example, the electronic device may obtain the sequence of a predetermined number of functions based on a priority order set by a manufacturer or by prioritizing functions frequently used by a user among the plurality of functions of the external electronic device.

According to an embodiment, the electronic device may arrange the function of turning on the external electronic device at the head of the sequence of the plurality of functions, may arrange the function of turning off the external electronic device at the end of the sequence, and the sequence of functions therebetween may be obtained based on the function information of the external electronic device.

Figure 9A:
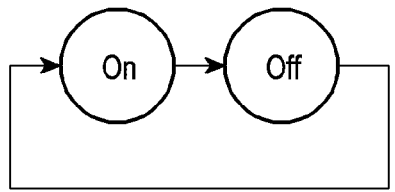
FIG. 9A is a diagram illustrating the sequence of a plurality of functions of an external electronic device according to an example embodiment.

FIG. 9A is a diagram illustrating the sequence of a plurality of functions of an external electronic device according to an example embodiment. For example, FIG. 9A is the sequence of functions including only on/off functions of an eternal electronic device.

Referring to FIG. 9A, in the case that the function of an external electronic device (e.g., the electronic device 104 of FIG. 1) is only functions of turning on and turning off the power, such as a smart lamp, the electronic device (e.g., the electronic device of FIG. 1 or the processor 120 of FIG. 1) may obtain the sequence of a plurality of functions that is configured to change a function mapped to a single set button of a remote controller (e.g., the electronic device 102 of FIG. 1) in order of the function of turning on the power of the external electronic device and the function of turning off the power of the external electronic device every time that the electronic device presses the single set button of the remote controller. According to an embodiment, the electronic device may obtain the sequence of the plurality of functions that is configured to cyclically have the function of turning on the power of the external electronic device as a function subsequent to the function of turning off the external electronic device.

Figure 9B:
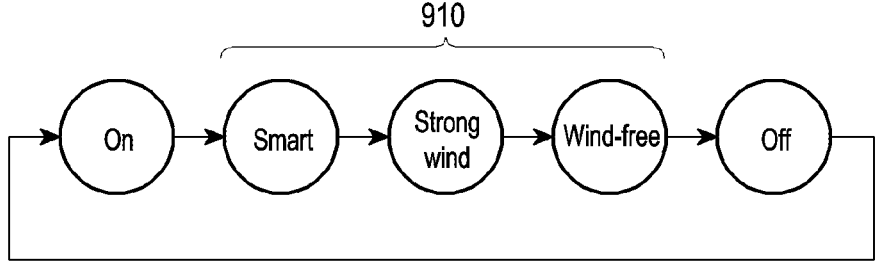
FIG. 9B is a diagram illustrating the sequence of a plurality of functions of an external electronic device according to an example embodiment.

FIG. 9B is a diagram illustrating the sequence of a plurality of functions of an external electronic device according to an example embodiment. For example, FIG. 9B illustrates the sequence of functions 910 including on/off functions and functions excluding number control in association with the external electronic device.

Referring to FIG. 9B, in the case that, similar to an air purifier, the functions of the external electronic device (e.g., the electronic device 104 of FIG. 1) include only the function of turning on and the function of turning off the power and the functions (e.g., smart, strong wind, light wind, gentle wind, and wind-free (sleep)) excluding number control, the electronic device (e.g., the electronic device of FIG. 1 or the processor 120 of FIG. 1) may obtain a main function (e.g., smart, strong wind, wind-free) among the functions of the external electronic device.

According to an embodiment, the sequence of the plurality of functions may be obtained that is configured to change a function mapped to a single set button of a remote controller (e.g., the electronic device 102 of FIG. 1) in order of the function of turning on the power of the external electronic device, a smart function, a strong wind function, a wind-free function, and the function of turning off the external electronic device every time that the single set button of the remote controller is pressed. According to an embodiment, the electronic device may obtain the sequence of the plurality of functions that is configured to cyclically have the function of turning on the power of the external electronic device as a function subsequent to the function of turning off the external electronic device.

Figure 9C:
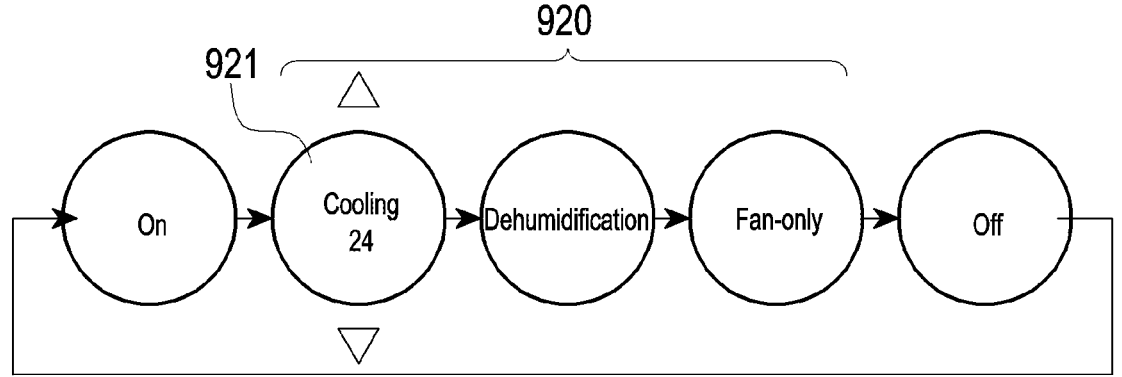
FIG. 9C is a diagram illustrating the sequence of a plurality of functions of an external electronic device according to an example embodiment.

FIG. 9C is a diagram illustrating the sequence of a plurality of functions of an external electronic device according to an example embodiment. For example, FIG. 9C illustrates the sequence of functions 920 including on/off functions of an external electronic device, a function excluding number control, and a function 921 including number control.

Referring to FIG. 9C, in the case that the functions of the external electronic device (e.g., the electronic device 104 of FIG. 1) includes the function of turning on and the function of turning off the power, the functions (e.g., dehumidification, fan-only, automatic operation, wind-free, tropical night, turn-off timer) excluding number control, and the function 921 (e.g., cooling) including number control, such as an air conditioner, the electronic device (e.g., an electronic device of FIG. 1 and/or the processor 120 of FIG. 1) may obtain a main function (e.g., cooling, dehumidification, and fan-only at 920) among the functions of the external electronic device.

According to an embodiment, the electronic device may obtain the sequence of the plurality of functions that is configured to change a function mapped to a single set button of a remote controller (e.g., the electronic device 102 of FIG. 1) in order of the function of turning on the power of the external electronic device, a cooling function 921, a dehumidification function, a fan-only function, and the function of turning off the external electronic device every time that the single set button of the remote controller is pressed. According to an embodiment, the electronic device may obtain the sequence of the plurality of functions that is configured to cyclically have the function of turning on the power of the external electronic device as a function subsequent to the function of turning off the external electronic device.

According to an embodiment, in the case that the external electronic device performs a cooling function 921 that is capable of adjusting a number, if a signal corresponding to operating an up button or a down button of the remote controller is received, the electronic device may increase or decrease a number corresponding to the temperature for cooling to correspond to the received signal.

Figure 10:
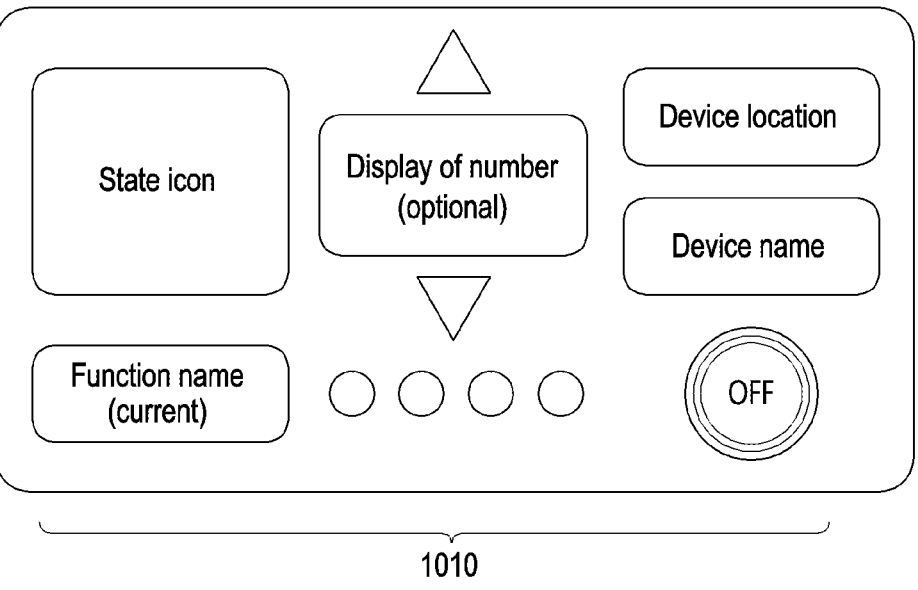
FIG. 10 is a diagram illustrating a user interface related to control of an external electronic device displayed in a partial area of a display of an electronic device according to an example embodiment.

FIG. 10 is a diagram illustrating a user interface related to control of an external electronic device displayed in a partial area of a display of an electronic device according to an example embodiment. For example, FIG. 10 relates to display in a partial area of a display (e.g., the display module 160 of FIG. 1, including a display) that is displaying a content.

Referring to FIG. 10, a user interface may include information 1010 associated with a state icon indicating the state of the external electronic device, a device location, a device name, and the sequence of a plurality of functions of the external electronic device. According to an embodiment, in the case that a function that the external electronic device is performing is a function capable of adjusting a number, number information may be further displayed.

According to an embodiment, the information 1010 related to the sequence of the plurality of functions of the external electronic device may include information associated with the number of functions executable using a single set button of a remote controller (e.g., the electronic device 102 of FIG. 1), information associated with a function that the external electronic device is executing, and information associated with the location of a function that the external electronic device is executing in the sequence of the plurality of functions.

Figure 11:
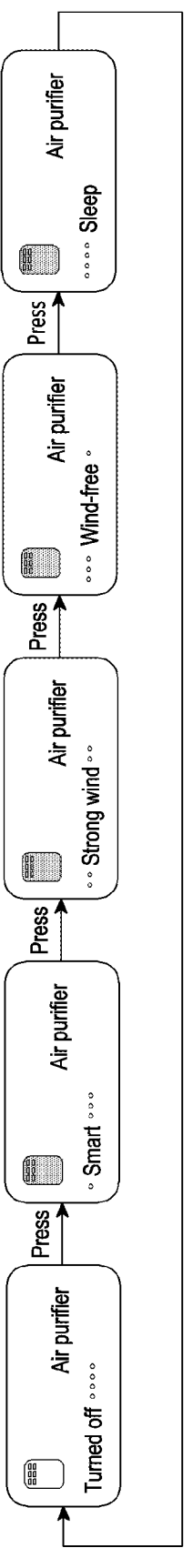
FIG. 11 is a diagram illustrating a user interface that is changed according to an external electronic device controlled by an electronic device according to an example embodiment.

FIG. 11 is a diagram illustrating a user interface that is changed according to an external electronic device controlled by an electronic device according to an example embodiment. For example, FIG. 11 illustrates the case in which the external electronic device is an air purifier.

Referring to FIG. 11, the electronic device (e.g., an electronic device of FIG. 1 and/or the processor 120 of FIG. 1) may change a user interface illustrated in a partial area of a display (e.g., the display module 160 of FIG. 1) every time that a signal corresponding to operation of a single set button of a remote controller (e.g., the electronic device 102 of FIG. 1) is received.

For example, every time that a signal corresponding to operating the single set button of the remote controller is received in the state in which the external electronic device is turned off, the user interface displayed may be sequentially changed to indicate that the external electronic device is performing a smart function, a strong wind function, a wind-free function, and sleep function.

As described above, by displaying the function that the external electronic device according to the disclosure is executing in a partial area of the display, a user is capable of easily controlling the external electronic device, while watching a content.

Figure 12:
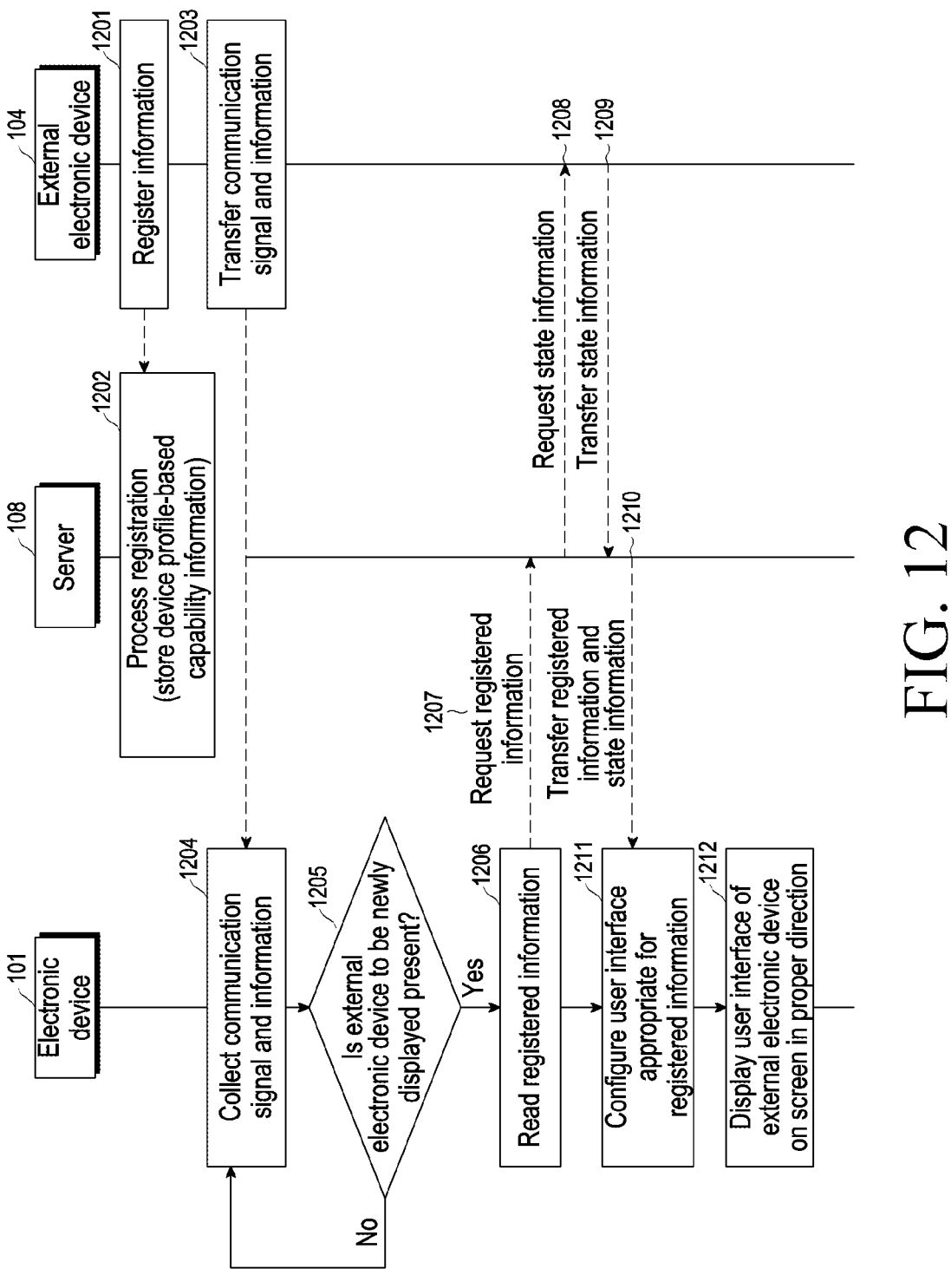
FIG. 12 is a flowchart illustrating an operation of displaying a user interface related to control of an external electronic device by an electronic device according to an example embodiment.

FIG. 12 is a flowchart illustrating an operation of displaying a user interface related to control of an external electronic device by an electronic device according to an example embodiment.

Referring to FIG. 12, in operation 1201, the external electronic device 104 (e.g., the electronic device 104 of FIG. 1) may register information in the server 108 (e.g., the server 108 of FIG. 1). For example, the external electronic device 104 may register, in the server 108, information associated with a device name, a model name, an install location, a list of functions remotely controllable, and/or a connection state.

According to an embodiment, in operation 1202, the server 108 may process registration of the external electronic device 104. For example, the server 108 may store device profile-based capability information of the external electronic device 104. For example, the capability information may include function information of the external electronic device 104.

According to an embodiment, in operation 1203, the external electronic device 104 may transfer a communication signal and information to the electronic device 101 (e.g., the electronic device 101 of FIG. 1).

According to an embodiment, in operation 1204, the electronic device 101 may collect the communication signal and information. For example, the electronic device 101 may receive a communication signal and information from an adjacent device (e.g., the external electronic device 104 or a remote controller (e.g., the electronic device 102 of FIG. 1)). For example, the electronic device 101 may receive the communication signal and information that the external electronic device 104 transmits in operation 1203.

According to an embodiment, in operation 1205, the electronic device 101 may identify whether an external electronic device that is to be newly displayed is present. For example, the electronic device 101 may identify whether the external electronic device 104 is located within a control area (e.g., the control area 410 of FIG. 4) based on the strength of a collected communication signal (e.g., a UWB signal, a Bluetooth signal, and a wi-fi signal). For example, the electronic device 101 may detect the external electronic device 104 based on the strength of a communication signal received from the external electronic device 104.

According to an embodiment, in the case that an external electronic device to be newly displayed is not present (No in operation 1205), the electronic device 101 may return to operation 1204 and may collect a communication signal and information. For example, in the case that the communication signal received from the external electronic device 104 is less than a set value, the electronic device 101 may identify that the external electronic device 104 is not located within the control area, and the external electronic device 104 is not an object to be controlled.

According to an embodiment, in the case that an external electronic device to be newly displayed is present (Yes in operation 1205), the electronic device 101 may read registered information in operation 1206. According to an embodiment, in operation 1207, the electronic device 101 may request registered information from the server 108, in order to read the registered information.

According to an embodiment, in operation 1208, the server 108 may request the state information of the external electronic device 104. For example, the state information of the external electronic device 104 may include information associated with a function that the external electronic device 104 is executing.

According to an embodiment, in operation 1209, the external electronic device 104 may transfer the state information to the server 108.

According to an embodiment, in operation 1210, the server 108 may transmit, to the electronic device 101, the registered information stored in the server 108 and the state information received from the external electronic device 104.

According to an embodiment, in operation 1211, the electronic device 101 may configure a user interface to be appropriate for the registered information. For example, based on the function information of the external electronic device 104 included in the registered information, the electronic device 101 may obtain the sequence of a plurality of functions to be sequentially performed using a single set button of a remote controller (e.g., the electronic device 102 of FIG. 1). According to an embodiment, the electronic device 101 may configure a user interface including the sequence of the plurality of functions. For example, based on the state information of the external electronic device 104, the electronic device 101 may further include information associated with a function that the external electronic device 104 is executing in the user interface.

According to an embodiment, based on the sequence of the plurality of functions and the state information of the external electronic device 104, the electronic device 101 may map a function to the single set button of the remote controller. For example, based on the state information of the external electronic device 104, the electronic device 101 may map, to the single set button of the remote controller, the function next of the function that the external electronic device 104 is executing according to the sequence of the plurality of functions.

According to an embodiment, in operation 1212, the electronic device 101 may display the user interface of the external electronic device 104 on a screen (e.g., the display module 160 of FIG. 1) in a proper direction.

Figure 13:
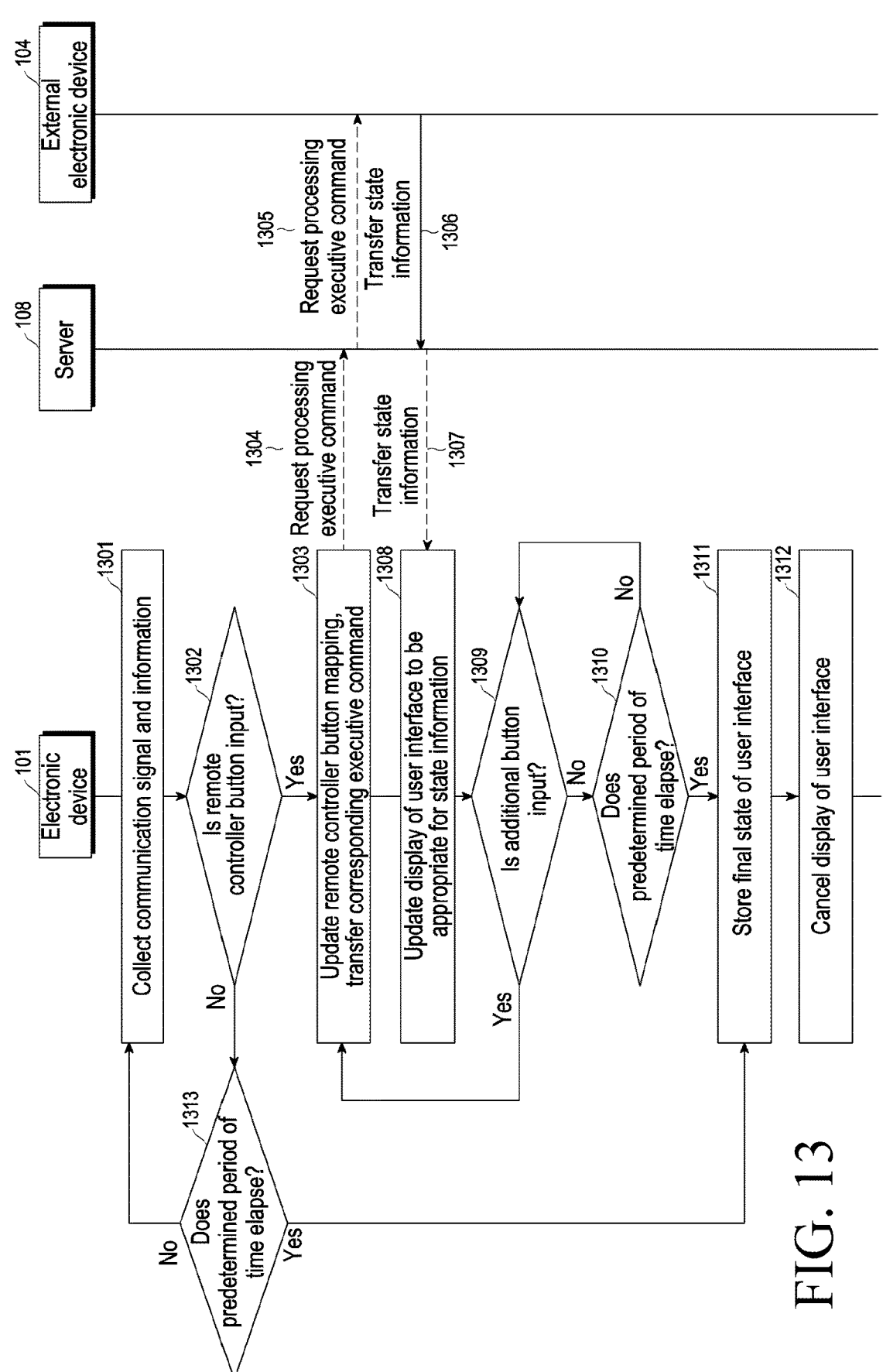
FIG. 13 is a diagram illustrating an operation of controlling an external electronic device via a single set button of a remote controller connected to an electronic device according to an example embodiment.

FIG. 13 is a diagram illustrating an operation of controlling an external electronic device via a single set button of a remote controller connected, directly or indirectly, to an electronic device according to an example embodiment. For example, FIG. 13 illustrates operations performed after a user interface is displayed in a partial area of a display (e.g., the display module 160 of FIG. 1) according to the process of FIG. 12.

Referring to FIG. 13, in operation 1301, the electronic device 101 (e.g., the electronic device 101 of FIG. 1) may collect a communication signal and information. For example, the electronic device 101 may receive a communication signal and information from an adjacent device (e.g., the external electronic device 104 (e.g., the electronic device 104 of FIG. 1)) or a remote controller (e.g., the electronic device 102 of FIG. 1).

According to an embodiment, in operation 1302, the electronic device 101 may identify whether an input is provided to a remote controller button. For example, the electronic device 101 may identify whether a signal corresponding to operation of a single set button of the remote controller is received.

According to an embodiment, in the case that a signal corresponding to operation of the single set button of the remote controller is received (Yes in operation 1302), the electronic device 101 may update remote controller button mapping, and may transfer a corresponding executive command to the external electronic device 104 in operation 1303. For example, in the case that the signal corresponding to operation of the single set button is received from the remote controller, the electronic device 101 may update a function mapped to the single set button of the remote controller with a subsequent function according to the sequence of the plurality of functions, and may transfer an executive command to the external electronic device 104 so that the external electronic device 104 executes the function mapped to the signal.

According to an embodiment, in operation 1304, the electronic device 101 may transmit an executive command processing request to the server 108. For example, the electronic device 101 may request the server 108 to process an executive command obtained based on a signal received from the remote controller.

According to an embodiment, in operation 1305, the server 108 may transmit, to the external electronic device 104, the executive command processing request received from the electronic device 101. For example, the server 108 may transmit, to the external electronic device 104, an executive command for executing a function of the external electronic device 104.

According to an embodiment, in operation 1306, the external electronic device 104 may execute a function corresponding to the executive command, and may transfer, to the server 108, state information including a function that the external electronic device 104 is executing.

According to an embodiment, in operation 1307, the server 108 may transmit, to the electronic device 101, the state information of the external electronic device 104 received from the external electronic device 104.

It is illustrated that the electronic device 101 transmits an executive command to the external electronic device 104 via the server 108 and receives the state information of the external electronic device 104 in operations 1304 to 1307 of FIG. 13, however, depending on an embodiment, the electronic device 101 may directly transmit an executive command to the external electronic device 104, and may receive the state information of the external electronic device 104.

According to an embodiment, in operation 1308, the electronic device 101 may update display of the user interface to be appropriate for the state information. For example, the electronic device 101 may update the user interface to include information associated with a function that the external electronic device 104 is executing.

According to an embodiment, in operation 1309, the electronic device 101 may identify whether an additional input is provided to the button. According to an embodiment, in the case that a signal corresponding to operation of the single set button of the remote controller is additionally received (Yes in operation 1309), the electronic device 101 may return to operation 1303, may transfer an executive command so that a function of the external electronic device that is mapped to the single set button of the remote controller is executed, and may change the function of the external electronic device that is mapped to the single set button of the remote controller according to the sequence of the plurality of functions of the external electronic device.

According to an embodiment, if a signal corresponding to operation of the single set button of the remote controller is not additionally received (No in operation 1309), the electronic device 101 may identify whether a predetermined period of time elapses in operation 1310.

According to an embodiment, in the case that a predetermined period of time does not elapse without an additional input to the button (No in operation 1310), the method returns to operation 1309 to identify whether an additional input is provided to the button.

According to an embodiment, in the case that a predetermined period of time elapses without an additional input to the button (Yes in operation 1310), the electronic device 101 may store the final state of the user interface in operation 1311, and may cancel display of the user interface in operation 1312. For example, in the state in which a user interface related to control of the external electronic device 104 is displayed in a partial area of the display, if a signal for controlling the external electronic device 104 is not received from the remote controller during a predetermined period of time, the electronic device 101 may delete the displayed user interface.

According to an embodiment, in the case that an input to the button of the remote controller is not provided in operation 1302 (No in operation 1302), the electronic device 101 may identify whether a predetermined period of time elapses without an input to the remote controller button in operation 1313.

According to an embodiment, in the case that a predetermined period of time does not elapse without an input to the remote controller button (No in operation 1313), the method may return to operation 1301 and may collect a communication signal and information. According to an embodiment, in the case that a predetermined period of time elapses without an input to the remote controller button (Yes in operation 1313), the electronic device 101 may proceed with operation 1311, may store the final state of the user interface in operation 1311, and may cancel the user interface.

Figure 14:
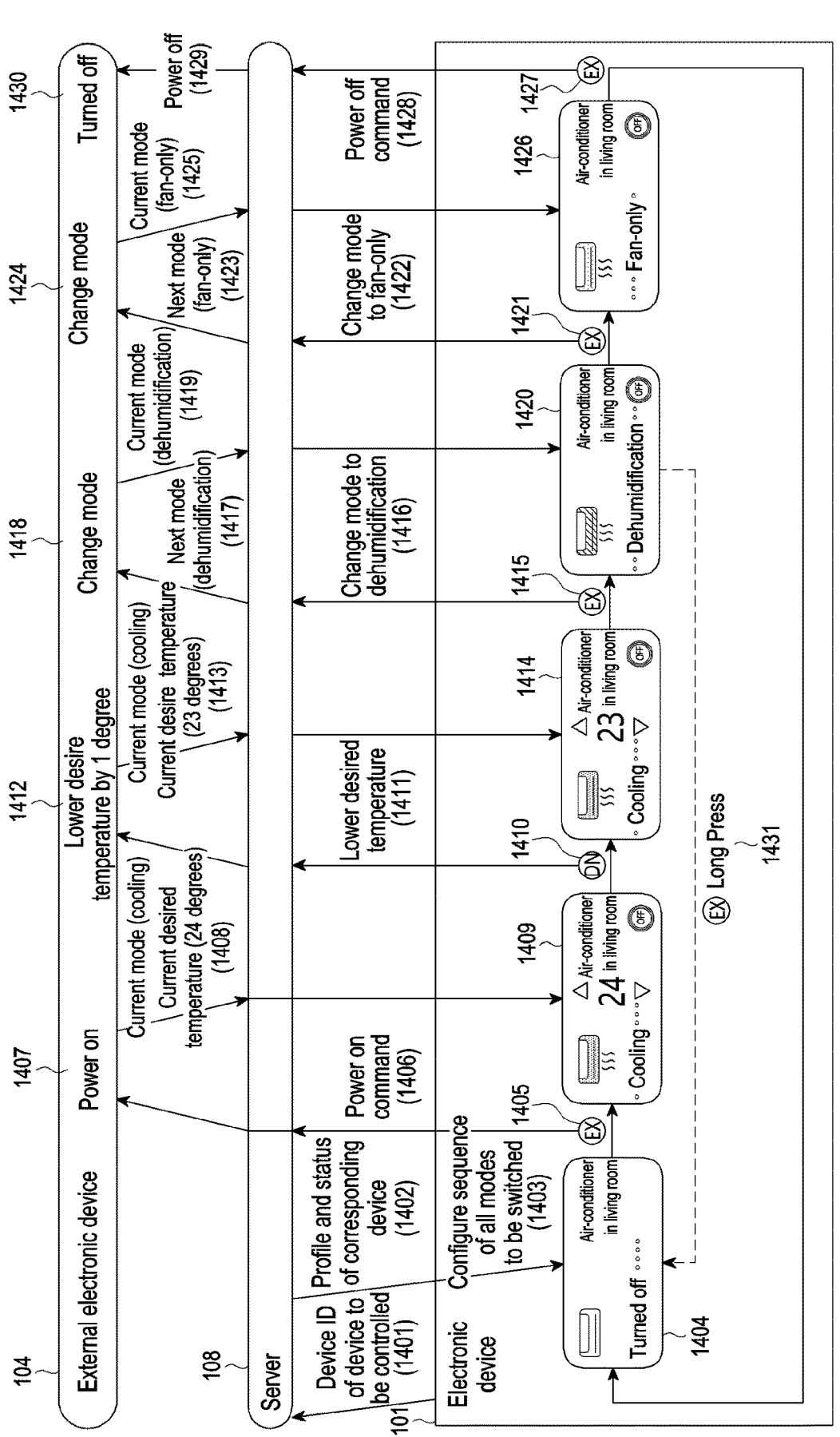
FIG. 14 is a diagram illustrating an operation of controlling an external electronic device via a single set button of a remote controller connected to an electronic device, and changing a user interface according to an example embodiment.

FIG. 14 is a diagram illustrating an operation of controlling an external electronic device via a single set button of a remote controller connected to an electronic device, and changing a user interface according to an example embodiment.

Referring to FIG. 14, in operation 1401, the electronic device 101 (e.g., the electronic device 101 of FIG. 1) may transmit the ID of an object device to be controlled to the server 108 (e.g., the server 108 of FIG. 1). For example, in the case that the electronic device 101 obtains the distance to the external electronic device 104 based on the strength of a communication signal (e.g., a UWB signal, a Bluetooth signal, a Wi-Fi signal) received from the external electronic device 104 (e.g., the electronic device 104 of FIG. 1), and detects that the external electronic device 104 is located within a control area (e.g., the control area 410 of FIG. 4), the electronic device 101 may transmit device information of the external electronic device 104 to the server 108 in order to control the external electronic device 104 using a remote controller (e.g., the electronic device 102 of FIG. 1), and may request function information of the external electronic device 104.

According to an embodiment, in operation 1402, the server 108 may transmit a profile and state information of the external electronic device 104 to the electronic device 101. For example, the profile of the external electronic device 104 may include the function information of the external electronic device 104 that is capable of being controlled remotely, and the state information of the external electronic device 104 may include information associated with whether the external electronic device is in the turned-on state or turned-off state, and information associated with a function that is being executed if the external electronic device is in the turned-on state.

According to an embodiment, in operation 1403, the electronic device 101 may configure the sequence of functions. For example, the electronic device 101 may obtain the sequence of a plurality of functions of the external electronic devices 104 based on the function information of the external electronic device 104 received from the server 108. According to an embodiment, the sequence of the plurality of functions may include the sequence of functions to be changed by operating a single set button of the remote controller connected to the electronic device 101, the functions being mapped to the single set button of the remote controller. For example, the sequence of the plurality of functions may include a function of turning on the external electronic device 104 at the head of the sequence and may include a function of turning off the external electronic device 104 at the end of the sequence, and it is the state in which the function of turning on the external electronic device 104 is mapped to the single set button of the remote controller.

According to an embodiment, in operation 1404, the electronic device 101 may display a user interface based on the state information and the sequence of functions of the external electronic device 104 received from the server 108. For example, the user interface may indicate that the external electronic device 104 is an air conditioner located in a living room, the number of functions of the external electronic device 104 that are remotely controllable is 5, and the external electronic device 104 is in the turned-off state.

According to an embodiment, in operation 1405, in the case that a signal corresponding to operation of a single set button (e.g., an extra button) of the remote controller is received from the remote controller, the electronic device 101 may map a subsequent function (e.g., dehumidification) as a function mapped to the single set button of the remote controller according to the sequence of the plurality of functions.

According to an embodiment, in operation 1406, the electronic device 101 may transmit, to the external electronic device 104 via the server 108, an executive command (e.g., a power on command) for executing the function of turning on the external electronic device 104 that is the function mapped to the single set button of the remote controller.

According to an embodiment, in operation 1407, the external electronic device 104 may perform the function of turning on based on the received executive command According to an embodiment, in operation 1408, the external electronic device 104 may transmit current state information to the electronic device 101 via the server 108. For example, the external electronic device 104 may transmit, to the electronic device 101, state information indicating that a cooling function is currently performed and a desired temperature is 24 degrees.

According to an embodiment, in operation 1409, the electronic device 101 may change the user interface based on the received state information of the external electronic device 104. For example, the user interface may be changed to indicate that the external electronic device 104 is currently performing the cooling function and the desired temperature is 24 degrees.

According to an embodiment, in the case that a signal corresponding to operation of a down button is received from the remote controller in operation 1410, the electronic device 101 may transmit an executive command for executing an operation of decreasing the desired temperature by 1 degree to the external electronic device 104 via the server 108 in operation 1411.

According to an embodiment, in operation 1412, the external electronic device 104 may perform the operation of decreasing the desired temperature by 1 degree based on the received executive command According to an embodiment, in operation 1413, the external electronic device 104 may transmit current state information to the electronic device 101 via the server 108. For example, the external electronic device 104 may transmit, to the electronic device 101, state information indicating that a cooling function is currently performed and a desired temperature is 23 degrees.

According to an embodiment, in operation 1414, the electronic device 101 may change the user interface based on the received state information of the external electronic device 104. For example, the user interface may be changed to indicate that the external electronic device 104 is currently performing the cooling function and the desired temperature is 23 degrees.

According to an embodiment, in operation 1415, in the case that a signal corresponding to operation of the single set button (e.g., an extra button) of the remote controller is received from the remote controller, the electronic device 101 may map a subsequent function (e.g., fan-only) as a function mapped to the single set button of the remote controller according to the sequence of the plurality of functions.

According to an embodiment, in operation 1416, the electronic device 101 may transmit, to the server 108, an executive command for executing a dehumidification function corresponding to the signal received from the remote controller. According to an embodiment, in operation 1417, the server 108 may transmit the executive command for executing the dehumidification function to the external electronic device 104.

According to an embodiment, in operation 1418, the external electronic device 104 may change, based on the received executive command, the function that is being executed. For example, the external electronic device 104 may terminate the cooling function that has been executed, and may execute the dehumidification function. According to an embodiment, in operation 1419, the external electronic device 104 may transmit current state information indicating that the dehumidification function is being performed to the electronic device 101 via the server 108.

According to an embodiment, in operation 1420, the electronic device 101 may change the user interface based on the received state information of the external electronic device 104. For example, the user interface may be changed to indicate that the external electronic device 104 is currently performing the dehumidification function.

According to an embodiment, in operation 1421, in the case that a signal corresponding to operation of the single set button (e.g., extra button) of the remote controller is received from the remote controller, the electronic device 101 may map a subsequent function (e.g., a power off function) as a function mapped to the single set button of the remote controller according to the sequence of the plurality of functions.

According to an embodiment, in operation 1422, the electronic device 101 may transmit, to the server 108, an executive command for executing a fan-only function corresponding to the signal received from the remote controller. According to an embodiment, in operation 1423, the server 108 may transmit the executive command for executing the fan-only function to the external electronic device 104.

According to an embodiment, in operation 1424, the external electronic device 104 may change, based on the received executive command, the function that is being executed. For example, the external electronic device 104 may terminate the dehumidification function that has been executed, and may execute the fan-only function. According to an embodiment, in operation 1425, the external electronic device 104 may transmit current state information indicating that the fan-only function is being performed to the electronic device 101 via the server 108.

According to an embodiment, in operation 1426, the electronic device 101 may change the user interface based on the received state information of the external electronic device 104. For example, the user interface may be changed to indicate that the external electronic device 104 is currently performing the fan-only function.

According to an embodiment, in operation 1427, in the case that a signal corresponding to operation of the single set button (e.g., an extra button) of the remote controller is received from the remote controller, the electronic device 101 may map a subsequent function (e.g., a power on function) as a function mapped to the single set button of the remote controller according to the sequence of the plurality of functions.

According to an embodiment, in operation 1428, the electronic device 101 may transmit, to the server 108, an executive command for executing a power-off function (e.g., power OFF Command) that is a function corresponding to the signal received from the remote controller. According to an embodiment, in operation 1429, the server 108 may transmit, to the external electronic device 104, the executive command for executing the power-off function to the external electronic device 104.

According to an embodiment, in operation 1430, the external electronic device 104 may turn off the power based on the received executive command According to an embodiment, in operation 1425, the external electronic device 104 may transmit current state information indicating that the fan-only function is being performed to the electronic device 101 via the server 108.

According to an embodiment, the electronic device 101 may change the user interface as shown in operation 1404. For example, the user interface may be changed to indicate that the external electronic device 104 is currently in the turned-off state.

According to an embodiment, referring to operation 1431, in the case that a signal corresponding to a set operation (e.g., a long press) performed on the single set button (e.g., an extra button) of the remote controller is received from the remote controller, the electronic device 101 may transmit an executive command associated with a set function (e.g., an operation of turning off the power) to the external electronic device 104, irrespective of the state of the external electronic device 104. According to an embodiment, the electronic device 101 may map, to the single set button of the remote controller, the function of turning on the power that is a function subsequent to the function of turning off the power, and may change the user interface to indicate that the external electronic device 104 is in the turned-off state.

Figure 15A:
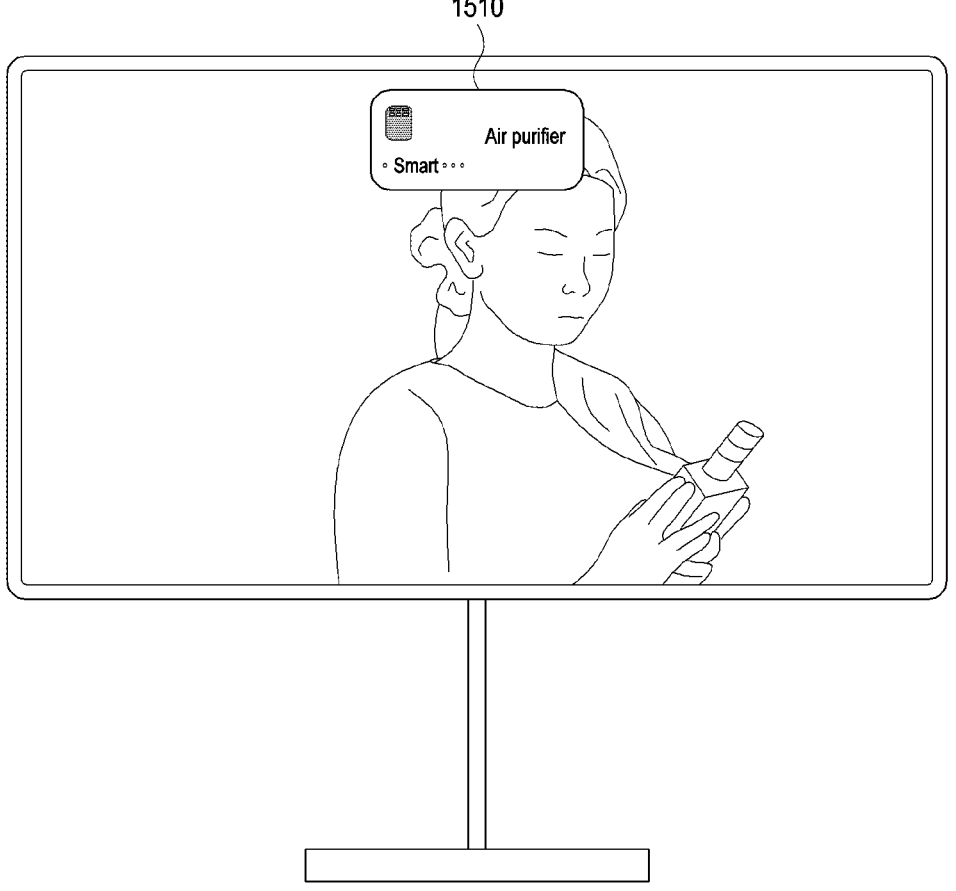
FIG. 15A is a diagram illustrating an operation of displaying a user interface while displaying a content in an electronic device according to an example embodiment.

FIG. 15A is a diagram illustrating an operation of displaying a user interface while displaying a content in an electronic device according to an example embodiment.

Referring to FIG. 15A, in the case that an external electronic device (e.g., the electronic device 104 of FIG. 1) is detected during content watching, an electronic device (e.g., the electronic device 101 of FIG. 1 or the processor 120 of FIG. 1) may display a user interface 1510 indicating that the external electronic device is controllable using a single set button of a remote controller (e.g., the electronic device 102 of FIG. 1) in a partial area (e.g., an edge area) of a display (e.g., the display module 160 of FIG. 1, including a display). For example, the user interface 1510 may include the type of external electronic device and state information (e.g., a smart function is being executed) of the external electronic device. According to an embodiment, the electronic device may obtain the sequence of a plurality of functions of the external electronic device controllable by the single set button of the remote controller.

According to an embodiment, in the case that a signal corresponding to operation of the single set button of the remote controller is received from the remote controller, the electronic device may transmit, to the external electronic device 104, an executive command of a function (e.g., strong wind) mapped to the single set button of the remote controller, and may map a subsequent function to the single set button of the remote controller according to the sequence of a plurality of functions of the external electronic device. According to an embodiment, as illustrated in FIG. 15B, the electronic device may change the user interface to indicate that the state of the external electronic device is changed.

Figure 15B:
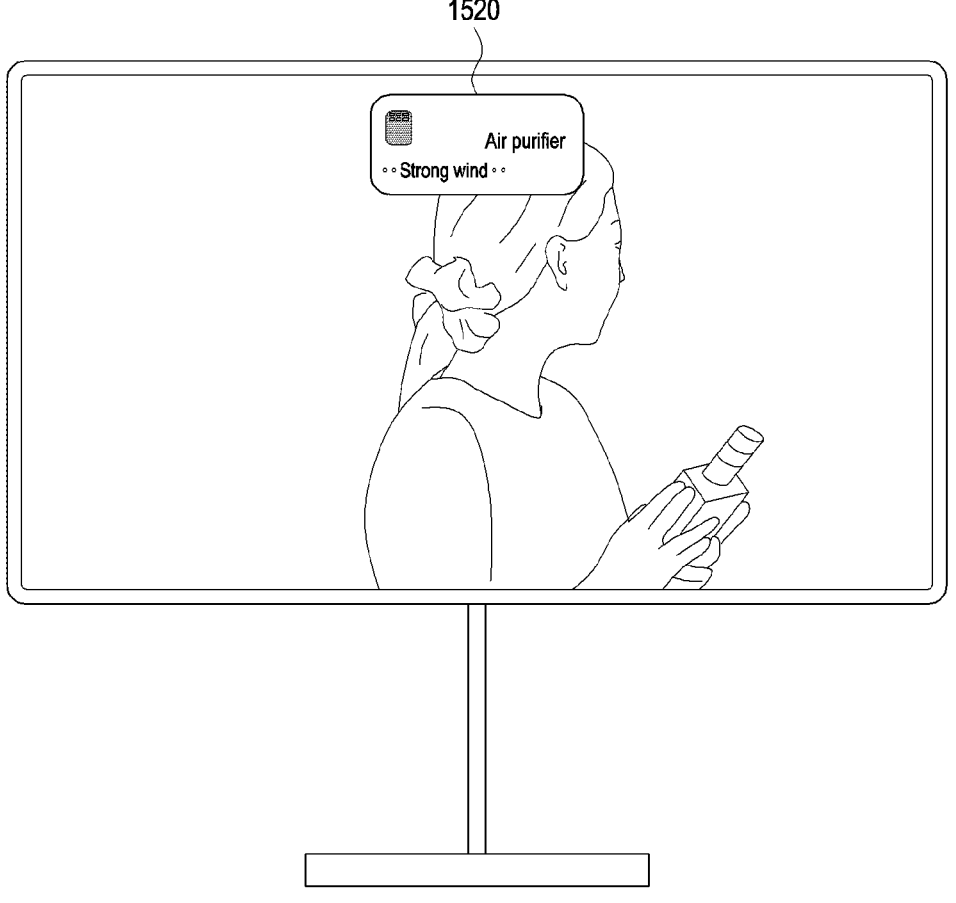
FIG. 15B is a diagram illustrating an operation of displaying a user interface while displaying a content in an electronic device according to an example embodiment.

FIG. 15B is a diagram illustrating an operation of displaying a user interface while displaying a content in an electronic device according to an example embodiment.

Referring to FIG. 15B, upon reception of a signal corresponding to operation of a single set button of a remote controller from the remote controller, the user interface 1510 of FIG. 15A may be changed to a user interface 1520 indicating that a strong wind function is being executed.

As described above, while reproducing a content, an electronic device according to an example embodiment may display a user interface related to an external electronic device in a partial area of a display, and thus may reduce disturbing of content watching and provide intuitive information associated with control of the external electronic device.

Figure 16A:
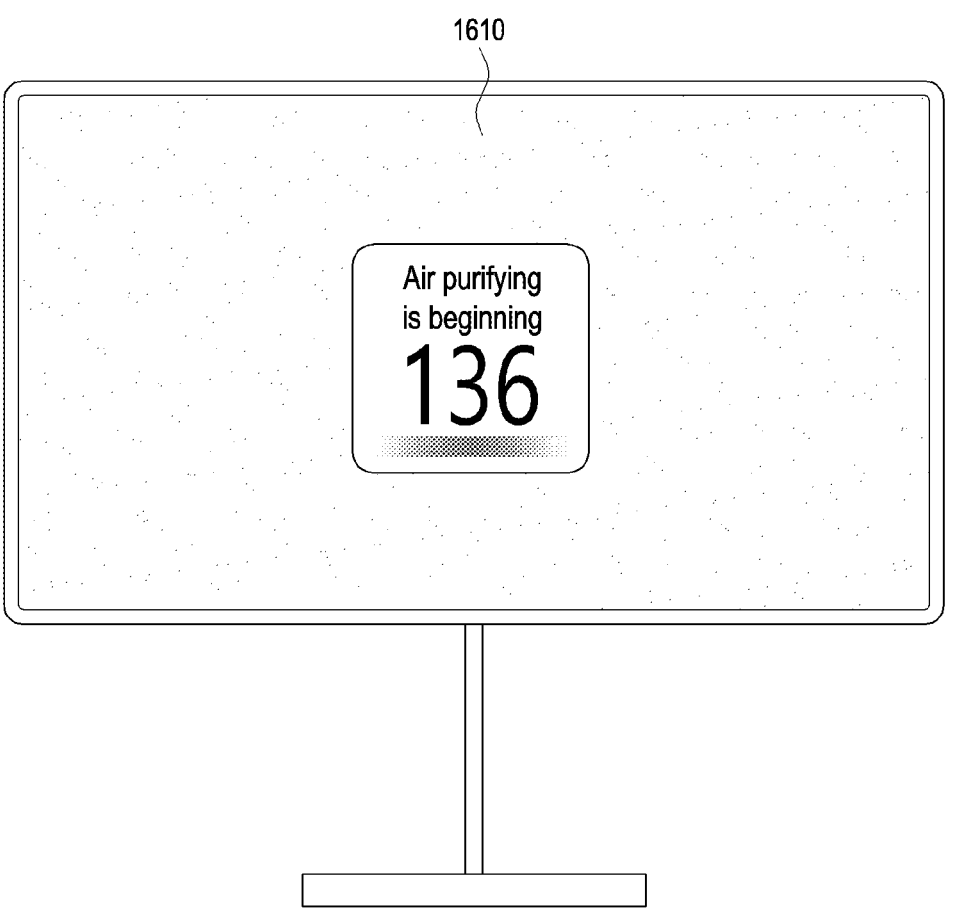
FIG. 16A is a diagram illustrating an operation of displaying a user interface while not displaying a content in an electronic device according to an example embodiment.

FIG. 16A is a diagram illustrating an operation of displaying a user interface while not displaying a content in an electronic device according to an example embodiment. For example, FIG. 16A illustrates the case in which a content is not being reproduced such as an idle mode, a magic screen, or an art mode, although the electronic device is turned on.

Referring to FIG. 16A, in the case that an external electronic device (e.g., the electronic device 104 of FIG. 1) is detected in the state in which an electronic device (e.g., the electronic device 101 of FIG. 1 or the processor 120 of FIG. 1) is turned on but a content is not being reproduced, the electronic device may display a user interface 1610 indicating that the external electronic device is controllable using a single set button of a remote controller (e.g., the electronic device 102 of FIG. 1) in a partial area (e.g., the center area) of a display (e.g., the display module 160 of FIG. 1). For example, the user interface 1610 may include the type of external electronic device and state information (e.g., an air purifier function is being performed, an air pollution level). According to an embodiment, the electronic device may display the state information of the external electronic device in detail in the state in which a content is not being reproduced. For example, as illustrated in FIG. 16B, the state information of the external electronic device may be displayed in real time.

Figure 16B:
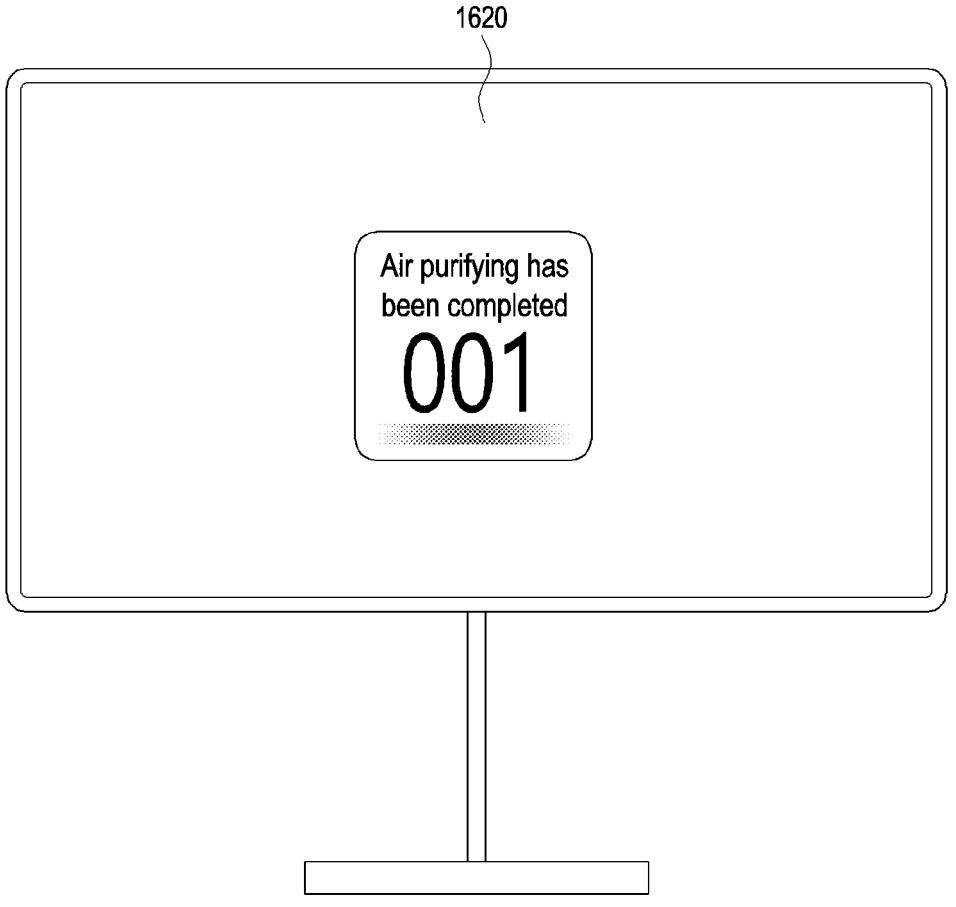
FIG. 16B is a diagram illustrating an operation of displaying a user interface while not displaying a content in an electronic device according to an example embodiment.

FIG. 16B is a diagram illustrating an operation of displaying a user interface while not displaying a content in an electronic device according to an example embodiment.

Referring to FIG. 16B, the electronic device may change a user interface 1620 to indicate information associated with executing a function of an external electronic device in real time.

FIGS. 16A and 16B illustrate that a user interface related to an external electronic device in a partial area of a display. However, in the case that a content is not being reproduced, as illustrated in FIG. 16C, a user interface related to an external electronic device may be displayed in the entire area of a display.

Figure 16C:
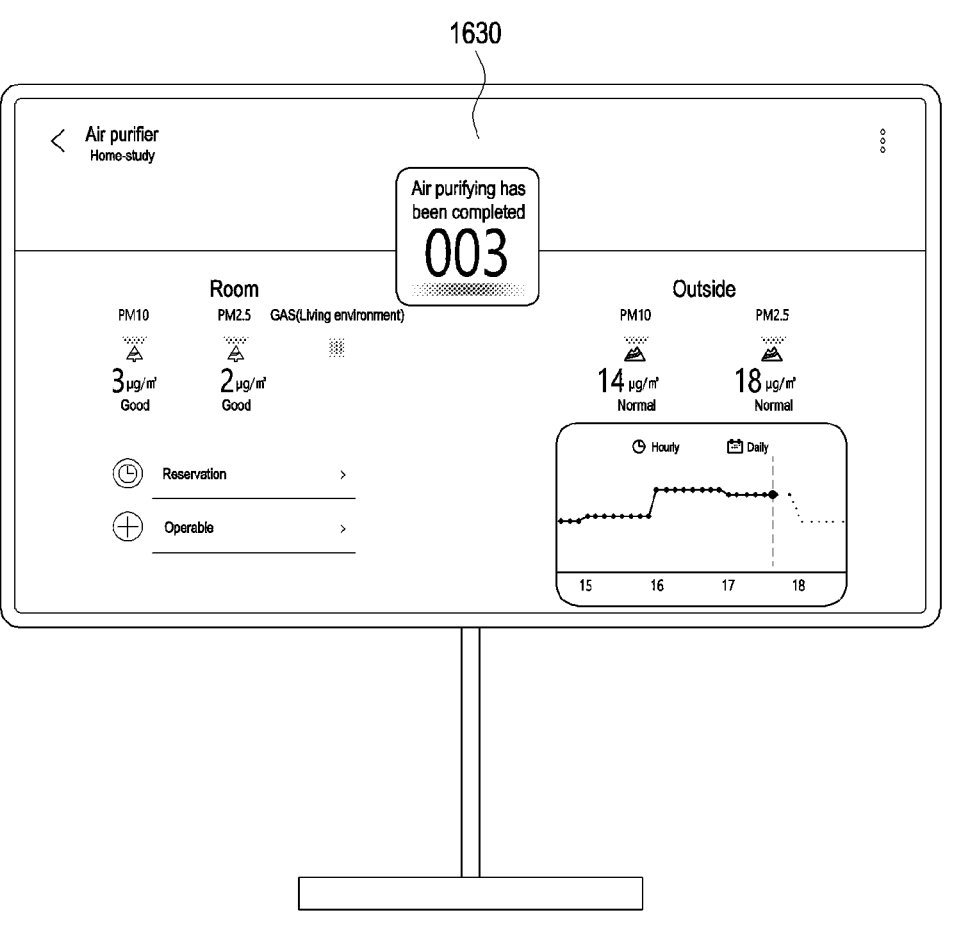
FIG. 16C is a diagram illustrating an operation of displaying a user interface while not displaying a content in an electronic device according to an example embodiment.

FIG. 16C is a diagram illustrating an operation of displaying a user interface while not displaying a content in an electronic device according to an example embodiment.

Referring to FIG. 16C, in the case that the power of the electronic device is turned on but a content is not being reproduced, if an external electronic device is detected, the electronic device may display a user interface 1630 related to the external electronic device in the entire area of a display. According to an embodiment, when the user interface 1630 related to the external electronic device is displayed in the entire area of the display, the electronic device may control the external electronic device by operation of another button included in the remote controller, as well as a single set button of a remote controller.

Figure 17:
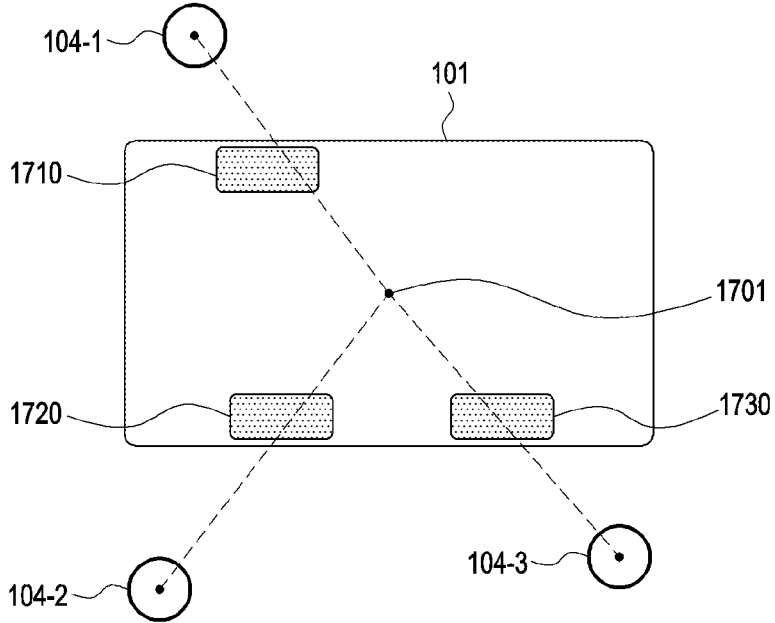
FIG. 17 is a diagram illustrating the location of a user interface displayed based on the location of an external electronic device relative to an electronic device according to an example embodiment.

FIG. 17 is a diagram illustrating the location of a user interface displayed based on the location of an external electronic device relative to an electronic device according to an example embodiment.

Referring to FIG. 17, based on the location of the electronic device 101 (e.g., the electronic device 101 of FIG. 1 or the processor 120 of FIG. 1) relative to an external electronic device 104-1, 104-2 and 104-3 (e.g., the electronic device 104 of FIG. 1), the electronic device 101 may determine a location where a user interface 1710, 1720, and 1730 related to the external electronic device 104-1, 104-2 and 104-3 is to be displayed. For example, the electronic device 101 may display the user interface 1710, 1720, and 1730 in an edge area of a display (e.g., the display module 160 of FIG. 1) that includes a line that connects the center 1701 of the display of the electronic device 101 and the location of the external electronic device 104-1, 104-2 and 104-3.

According to an embodiment in the case that the first external electronic device 104-1 is located in the top-left direction of the electronic device 101, the electronic device 101 may display the user interface 1710 related to the first external electronic device 104-1 in a top left edge area of the display.

According to an embodiment in the case that the second external electronic device 104-2 is located in the bottom-left direction of the electronic device 101, the electronic device 101 may display the user interface 1720 related to the second external electronic device 104-2 in a bottom left edge area of the display.

According to an embodiment in the case that the third external electronic device 104-3 is located in the bottom-right direction of the electronic device 101, the electronic device 101 may display the user interface 1730 related to the third external electronic device 104-3 in a bottom right edge area of the display.

As described above, by displaying a user interface related to an external electronic device based on the location of the external electronic device relative to an electronic device, information associated with the external electronic device that is being controlled may be intuitively provided to a user.

According to an embodiment, an electronic device (e.g., the electronic device 101 of FIG. 1) may include at least one communication circuit (e.g., the communication module 190 of FIG. 1), a display (e.g., the display module 160 of FIG. 1), a memory (e.g., the memory 130 of FIG. 1), and at least one processor (e.g., the processor 120 of FIG. 1), and the at least one processor may be configured to obtain function information associated with an external electronic device in the case that the external electronic device is detected via the at least one communication circuit, to obtain, based on the function information associated with the external electronic device, the sequence of a plurality of functions of the external electronic device that are mapped to a single set button included in a remote controller that communicates with the electronic device, to control the display to display, in a partial area of the display, a user interface indicating that the external electronic device is controllable via the single set button of the remote controller, and to transmit an executive command associated with a first function mapped to the single set button according to the sequence of the plurality of functions to the external electronic device via the at least one communication circuit in the case that a signal corresponding to operation of the single set button of the remote controller is received.

"Based on" as used herein covered based at least on.

According to an embodiment, after receiving a signal corresponding to operation of the single set button of the remote controller, the at least one processor may map a second function that is a function subsequent to the first function to the single set button of the remote controller according to the sequence of the plurality of functions.

According to an embodiment, the user interface may include information associated with the sequence of the plurality of functions and information associated with a function that the external electronic device is executing among the plurality of functions.

According to an embodiment, the plurality of functions may include a function of turning on power of the external electronic device and a function of turning off the power of the external electronic device, and the at least one processor may transmit, to the external electronic device, an executive command associated with the function of turning off the power of the external electronic device in the case that a signal corresponding to a long press on the single set button of the remote controller is received.

According to an embodiment, the at least one processor may be configured to display, in a partial area of the display, a message for identifying whether to control the external electronic device using the single set button of the remote controller in the case that the external electronic device is detected via the at least one communication circuit, and to display, in a partial area of the display, the user interface, in the case that a user input for controlling the external electronic device using the single set button of the remote controller is received in response to the message.

According to an embodiment, the at least one processor may be configured to obtain the sequence of the plurality of external electronic devices mapped to the single set button of the remote controller in the case that the plurality of external electronic devices are detected via the at least one communication circuit, and to identify an object device to be controlled by the single set button of the remote controller according to the sequence of the plurality of external electronic devices in the case that a signal corresponding to operation of the single set button of the remote controller is received According to an embodiment, the at least one processor may display the user interface in a partial area of the display that is related to the location of the external electronic device relative to the electronic device.

According to an embodiment, the at least one processor may be configured to obtain function information associated with the external electronic device from a server via the at least one communication circuit.

According to an embodiment, the at least one processor may be configured to transmit the executive command associated with the first function to a server via the at least one communication circuit so that the server transmits the executive command associated with the first function to the external electronic device.

According to an embodiment, the at least one processor may delete the user interface in the case that a signal corresponding to operation of the single set button of the remote controller is not received within a predetermined period time after the user interface is displayed.

According to an embodiment, a control method of an electronic device may include an operation of obtaining function information associated with an external electronic device in the case that the external electronic device is detected via at least one communication circuit, an operation of obtaining, based on the function information associated with the external electronic device, the sequence of a plurality of functions of the external electronic device that are mapped to a single set button included in a remote controller that communicates with the electronic device, an operation of controlling a display to display, in a partial area of the display, a user interface indicating that the external electronic device is controllable via the single set button of the remote controller, and an operation of transmitting an executive command associated with a first function mapped to the single set button according to the sequence of the plurality of functions to the external electronic device via the at least one communication circuit in the case that a signal corresponding to operation of the single set button of the remote controller is received.

According to an embodiment, the method may further include an operation of mapping a second function that is a function subsequent to the first function to the single set button of the remote controller according to the sequence of the plurality of functions, after a signal corresponding to operation of the single set button of the remote controller is received.

According to an embodiment, the user interface may include information associated with the sequence of the plurality of functions and information associated with a function that the external electronic device is executing among the plurality of functions.

According to an embodiment, the plurality of functions may include a function of turning on power of the external electronic device and a function of turning off the power of the external electronic device, and the method may further include an operation of transmitting, to the external electronic device, an executive command associated with the function of turning off the power of the external electronic device in the case that a signal corresponding to a long press on the single set button of the remote controller is received.

According to an embodiment, the method may further include an operation of displaying, in a partial area of the display, a message for identifying whether to control the external electronic device using the single set button of the remote controller in the case that the external electronic device is detected via the at least one communication circuit, and the operation of controlling the display to display the user interface in the partial area of the display may include an operation of displaying the user interface in the partial area of the display in the case that a user input for controlling the external electronic device using the single set button of the remote controller is received in response to the message.

According to an embodiment, the method may further include an operation of obtaining the sequence of a plurality of external electronic devices mapped to the single set button of the remote controller in the case that the plurality of external electronic devices are detected via the at least one communication circuit, and an operation of identifying an object device to be controlled by the single set button of the remote controller according to the sequence of the plurality of external electronic devices in the case that a signal corresponding to operation of the single set button of the remote controller is received.

According to an embodiment, the operation of controlling the display to display the user interface in a partial area of the display may include an operation of displaying the user interface in a partial area of the display that is related to the location of the external electronic device relative to the electronic device.

According to an embodiment, the operation of obtaining the function information of the external electronic device may include an operation of obtaining the function information associated with the external electronic device from a server via the at least one communication circuit.

According to an embodiment, the operation of transmitting the executive command associated with the first function to the external electronic device may include an operation of transmitting the executive command associated with the first function to a server via the at least one communication circuit so that the server transmits the executive command associated with the first function to the external electronic device.

According to an embodiment, the method may further include an operation of deleting the user interface in the case that a signal corresponding to operation of the single set button of the remote controller is not received within a predetermined period of time after the user interface is displayed.

Each embodiment herein may be used in combination with any other embodiment(s) described herein.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various embodiments, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   at least one communication circuit;
   a display;
   memory storing instructions; and
   at least one processor comprising processing circuitry, wherein the instructions, when executed by the at least one processor, individually and/or collectively, cause the electronic device to:

obtain function information associated with an external electronic device based on the external electronic device being detected via the at least one communication circuit, obtain, based on the function information associated with the external electronic device, a sequence of a plurality of functions of the external electronic device that are mapped to a single set button included in a remote controller for communicating with the electronic device, display, in a partial area of the display, a user interface indicating at least that the external electronic device is controllable via the set button of the remote controller, and based on signals corresponding to sequential operations of the set button of the remote controller being received, sequentially transmit executive commands to the external electronic device, wherein each of the executive commands is associated with a different function in the sequence of the plurality of functions mapped to the set button, wherein for sequentially transmit executive commands, the instructions, when executed by the at least one processor, individually and/or collectively, cause the electronic device to:

receive a first signal corresponding to a first operation of the set button of the remote controller, transmit, to the external electronic device, a first executive command associated with a first function of the plurality of functions based on receiving the first signal, after transmitting the first executive command, receive a second signal corresponding to a second operation of the set button of the remote controller, and transmit, to the external electronic device, a second executive command associated with a second function subsequent to the first function of the plurality of functions.

2. The electronic device of claim 1, wherein the instructions, when executed by the at least one processor, individually and/or collectively, cause the electronic device to, after receiving a signal corresponding to operation of the set button of the remote controller for mapping the first function, map the second function that is a function subsequent to the first function to the set button of the remote controller based on the sequence of the plurality of functions.

3. The electronic device of claim 1, wherein the user interface comprises information associated with the sequence of the plurality of functions and information associated with a function that the external electronic device is to execute among the plurality of functions.

4. The electronic device of claim 1, wherein the plurality of functions comprise a function for turning on power of the external electronic device and a function for turning off the power of the external electronic device, and the instructions, when executed by the at least one processor, individually and/or collectively, cause the electronic device to transmit, to the external electronic device, an executive command associated with the function for turning off the power of the external electronic device based on a signal corresponding to a predetermined press on the set button of the remote controller being received.

5. The electronic device of claim 1, wherein the instructions, when executed by the at least one processor, individually and/or collectively, cause the electronic device to:

display, in a partial area of the display, a message for identifying whether to control the external electronic device using the single set button of the remote controller based on the external electronic device being detected, and display the user interface in a partial area of the display based on a user input for controlling the external electronic device using the single set button of the remote controller being received in response to the message.

6. The electronic device of claim 1, wherein the set button is a single set button, and wherein the instructions, when executed by the at least one processor, individually and/or collectively, cause the electronic device to:

obtain a sequence of the plurality of external electronic devices mapped to the single set button of the remote controller based on the plurality of external electronic devices being detected, and identify an object device to be controlled by the single set button of the remote controller based on the sequence of the plurality of external electronic devices in response to a signal corresponding to operation of the single set button of the remote controller being received.

7. The electronic device of claim 1, wherein the instructions, when executed by the at least one processor, individually and/or collectively, cause the electronic device to display the user interface in a partial area of the display that is related to a location of the external electronic device relative to the electronic device.

8. The electronic device of claim 1, wherein the instructions, when executed by the at least one processor, individually and/or collectively, cause the electronic device to obtain function information associated with the external electronic device from a server.

9. The electronic device of claim 1, wherein the instructions, when executed by the at least one processor, individually and/or collectively, cause the electronic device to transmit the executive command associated with the first function to a server so that the server can transmit the executive command associated with the first function to the external electronic device.

10. The electronic device of claim 1, wherein the set button is a single set button, and wherein the at least one processor is configured to delete the user interface based on a signal corresponding to operation of the single set button of the remote controller being not received within a predetermined period time after the user interface is displayed.

11. A control method of an electronic device, the method comprising:

obtaining function information associated with an external electronic device based on the external electronic device being detected;

obtaining, based on the function information associated with the external electronic device, a sequence regarding a plurality of functions of the external electronic device that are mapped to a single set button included in a remote controller for communicating with the electronic device;

display, in a partial area of the display, a user interface indicating that the external electronic device is controllable via the single set button of the remote controller; and based on signals corresponding to sequential operations of the set button of the remote controller being received, sequentially transmitting executive commands, to the external electronic device, wherein each of the executive commands is associated with a different function in the sequence of the plurality of functions mapped to the set button wherein sequentially transmitting the executive commands comprises:

receiving a first signal corresponding to a first operation of the set button of the remote controller, transmitting, to the external electronic device, a first executive command associated with a first function of the plurality of functions based on receiving the first signal, after transmitting the first executive command, receiving a second signal corresponding to a second operation of the set button of the remote controller, and transmitting, to the external electronic device, a second executive command associated with a second function subsequent to the first function of the plurality of functions.

12. The method of claim 11, further comprising mapping the second function that is a function subsequent to the first function to the single set button of the remote controller based on the sequence regarding the plurality of functions, after a signal corresponding to operation of the single set button of the remote controller for mapping the first function is received.

13. The method of claim 11, wherein the user interface includes information associated with the sequence regarding the plurality of functions and information associated with a function that the external electronic device is to execute among the plurality of functions.

14. The method of claim 11, wherein the plurality of functions comprise a function for turning on power of the external electronic device and a function for turning off the power of the external electronic device, and wherein the method further comprises transmitting, to the external electronic device, an executive command associated with the function for turning off the power of the external electronic device based on a signal corresponding to a predetermined press on the single set button of the remote controller being received.

15. The method of claim 11, further comprising displaying, in a partial area of the display, a message for identifying whether to control the external electronic device using the single set button of the remote controller based on the external electronic device being detected-via-the-at-least-er circuit, wherein the controlling of the display to display the user interface in the partial area of the display comprises displaying the user interface in the partial area of the display based on a user input for controlling the external electronic device using the single set button of the remote controller being received in response to the message.

16. The method of claim 11, further comprising:

obtaining a sequence of a plurality of external electronic devices mapped to the single set button of the remote controller based on the plurality of external electronic devices being detected; and identifying an object device to be controlled by the single set button of the remote controller based on the sequence of the plurality of external electronic devices in response to a signal corresponding to operation of the single set button of the remote controller being received.

17. The method of claim 11, wherein the controlling of the display to display the user interface in a partial area of the display comprises displaying the user interface in a partial area of the display that is related to a location of the external electronic device relative to the electronic device.

18. The method of claim 11, wherein the obtaining of the function information of the external electronic device comprises obtaining the function information associated with the external electronic device from a server.

19. The method of claim 11, wherein the transmitting of the executive command associated with the first function to the external electronic device comprises transmitting the executive command associated with the first function to a server so that the server can transmit the executive command associated with the first function to the external electronic device.

20. The method of claim 11, further comprising deleting the user interface based on a signal corresponding to operation of the single set button of the remote controller not being received within a predetermined period of time after the user interface is displayed.

* * * * *